US008667337B2

(12) United States Patent
Itoyama et al.

(10) Patent No.: US 8,667,337 B2
(45) Date of Patent: Mar. 4, 2014

(54) STORAGE APPARATUS AND METHOD OF CONTROLLING THE SAME

(75) Inventors: Takashi Itoyama, Odawara (JP); Ikuya Yagisawa, Machida (JP); Yoshifumi Mimata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 375 days.

(21) Appl. No.: 13/125,901

(22) PCT Filed: Apr. 12, 2011

(86) PCT No.: PCT/JP2011/002157
§ 371 (c)(1),
(2), (4) Date: Apr. 25, 2011

(87) PCT Pub. No.: WO2012/140692
PCT Pub. Date: Oct. 18, 2012

(65) Prior Publication Data
US 2012/0266027 A1    Oct. 18, 2012

(51) Int. Cl.
*G06F 11/00*    (2006.01)
(52) U.S. Cl.
USPC .......................................................... 714/42
(58) Field of Classification Search
USPC .......................................................... 714/42
See application file for complete search history.

(56) References Cited

U.S. PATENT DOCUMENTS

| 2007/0180293 | A1  | 8/2007  | Takahashi |
| 2008/0010530 | A1* | 1/2008  | Davies et al. ................... 714/31 |
| 2009/0105982 | A1  | 4/2009  | Sarig et al. |
| 2009/0204743 | A1  | 8/2009  | Inoue et al. |
| 2009/0319822 | A1  | 12/2009 | Coronado et al. |
| 2010/0002588 | A1* | 1/2010  | Cantwell et al. ............. 370/241 |
| 2010/0325484 | A1* | 12/2010 | Suzuki et al. ................... 714/14 |
| 2011/0185226 | A1* | 7/2011  | Douchi et al. ............... 714/6.22 |

FOREIGN PATENT DOCUMENTS

| JP | 2007-206766 A | 8/2007 |
| JP | 2009-187483 A | 8/2009 |

* cited by examiner

*Primary Examiner* — Bryce Bonzo
(74) *Attorney, Agent, or Firm* — Volpe and Koenig, P.C.

(57) ABSTRACT

Deterioration of performance due to diagnosis processing performed when a failure occurs is prevented. A storage apparatus 10 includes a controller 11A and a plurality of expanders 112A, 121A coupled to the controller 11A to form a first system, and includes a controller 11B and a plurality of expanders 112B, 121B coupled to the controller 11B to form a second system. The controller 11A accesses the storage drive 171 through the expanders 112A, 121A, and the second controller 11B accesses the storage drive through the expanders 112B, 121B. In the storage apparatus 10, the controller 11A stores a maximum number (concurrently-executable maximum number) of communication ports 80 that are concurrently diagnosable in the first system, and repeatedly executes a process of selecting the communication ports 80 not exceeding the concurrently-executable maximum number and a process of causing the expanders 112A, 121A to diagnose the selected communication ports 80.

13 Claims, 21 Drawing Sheets

PORT MANAGEMENT TABLE 75

| PORT ID | a1 | a2 | ... |
|---|---|---|---|
| ERROR COUNTER VALUE | n1 | n2 | ... |
| OPERATION MODE | I/O MODE | DIAGNOSIS MODE | ... |

Fig. 9

PORT MANAGEMENT TABLE 64

| CHASSIS ID | EXPANDER ID | | PORT ID | PORT ID | ... |
|---|---|---|---|---|---|
| BASIC CHASSIS | CTL0 | | a1 | a2 | ... |
| | | PRIORITY | 14 | 10 | ... |
| | | ERROR COUNTER VALUE | n1 | n2 | ... |
| | | OPERATION MODE | I/O MODE | DIAGNOSIS MODE | ... |
| | | DIAGNOSIS RESULT | — | — | ... |
| | CTL1 | | p1 | p2 | ... |
| | | PRIORITY | 12 | 17 | ... |
| | | ERROR COUNTER VALUE | n3 | n4 | ... |
| | | OPERATION MODE | I/O MODE | I/O MODE | ... |
| | | DIAGNOSIS RESULT | — | — | ... |
| EXPANDED CHASSIS #1 | EXP0 | | b1 | b2 | ... |
| | | PRIORITY | 6 | 7 | ... |
| | | ERROR COUNTER VALUE | n1 | n2 | ... |
| | | OPERATION MODE | I/O MODE | DIAGNOSIS MODE | ... |
| | | DIAGNOSIS RESULT | — | — | ... |
| | EXP1 | | q1 | q2 | ... |
| | | PRIORITY | 4 | 5 | ... |
| | | ERROR COUNTER VALUE | n3 | n4 | ... |
| | | OPERATION MODE | I/O MODE | I/O MODE | ... |
| | | DIAGNOSIS RESULT | — | — | ... |
| : | : | : | : | : | : |

Fig. 13

CONCURRENTLY-EXECUTABLE MAXIMUM NUMBER SETTING SCREEN 1300

DIAGNOSIS PERFORMANCE SETTING SCREEN

SPECIFY PERFORMANCE OF STORAGE APPARATUS
IN NETWORK PORT DIAGNOSIS

○ HIGH SPEED
○ MEDIUM SPEED
○ LOW SPEED

*WHEN HIGH SPEED IS SELECTED, NETWORK PORT DIAGNOSIS REQUIRES LONGER TIME THAN WHEN MEDIUM OR LOW SPEED IS SELECTED.

[ SET ]   [ CANCEL ]

Fig. 18

CONFIGURATION INFORMATION 1800

| CHASSIS ID | EXPANDER ID | | PORT ID | PORT ID | ... |
|---|---|---|---|---|---|
| BASIC CHASSIS | CTL0 | | a1 | a2 | ... |
| | | COUPLED PORT | b1 | b2 | ... |
| | CTL1 | | ... | ... | ... |
| | | COUPLED PORT | ... | ... | ... |
| EXPANDED CHASSIS #1 | EXP0 | | b1 | b2 | ... |
| | | COUPLED PORT | a1 | a2 | ... |
| | EXP1 | | ... | ... | ... |
| | | COUPLED PORT | ... | ... | ... |
| : | : | : | : | : | : |

STORAGE APPARATUS AND METHOD OF CONTROLLING THE SAME

TECHNICAL FIELD

The present invention relates to a storage apparatus and a method of controlling the storage apparatus.

BACKGROUND ART

Patent Literature (PTL) 1 discloses a storage sub-system which is configured to minimize the degradation of system performance while improving reliability and availability of the storage sub-system. Specifically, the storage sub-system includes a first controller to control a plurality of drive units coupled to the first controller through a plurality of first switch devices, a second controller to control the a plurality of drive units coupled to the second controller through a plurality of second switch devices corresponding to the a plurality of first switch devices, and a connection path through which each of the plurality of first switch devices and the corresponding one of the plurality of second switch devices are coupled to each other. When the storage sub-system detects an occurrence of a failure, a defective portion in the connection path is identified and a coupling configuration of the switch devices is changed so as to avoid the defective portion.

Patent Literature (PTL) 2 discloses a data storage system in which controllers are coupled to a group of disk drives through transmission paths. The data storage system is configured to be capable of identifying which one of the group of the disk drives and the transmission paths has a failure when a failure is detected. Specifically, the data storage system includes a plurality of disk storage devices storing data and at least one pair of controllers which are coupled to the plurality of disk storage devices through one pair of transmission paths, respectively, and control accesses to the disk storage devices in response to access instructions from a higher-level device. In the data storage system, when one controller accesses a disk storage device through one transmission path, and detects an error from a result of the response from the disk storage devices, diagnosis processing is started in response to the detection. Then, the other controller is caused to access the disk storage device, which has been accessed by the one controller, through the other transmission path. From the result of the response from the disk storage device received by the other controller, either of the disk storage devices or the transmission path is identified to be the portion having a failure.

CITATION LIST

Patent Literature

PTL 1: Japanese Patent Application Laid-open Publication No. 2009-187483
PTL 2: Japanese Patent Application Laid-open Publication No. 2007-206766

SUMMARY OF INVENTION

Technical Problem

In the storage system including a redundant configuration of a first controller and a second controller as disclosed in PTL 1, when a failure occurs in a system under one of the controllers, it is necessary to stop I/O processing through switch devices in the system and to diagnose the communication ports included in the switch devices in the system. In this case, the I/O processing has to be performed only through the other of the system until the diagnosis on the system is completed. Thus, loads are concentrated on the other system, which results in degradation of the performance of the storage system.

The present invention has been made in view of the above-described background.

Thus, an object of the invention is to provide a storage apparatus and a method of controlling a storage apparatus, which are capable of preventing performance degradation due to diagnosis processing which is performed when a failure occurs.

Solution to Problem

To achieve the object, an aspect of the present invention is a storage apparatus including: a first controller having a processor, a memory, and a network I/F that receives a data input/output request from an external apparatus; a second controller having a processor, a memory, and a network I/F that receives a data input/output request from the external apparatus; a plurality of first expanders configuring a first system by being communicatively coupled to a storage drive, having a plurality of communication ports, and being in cascade connection with the first controller through the communication ports; a plurality of second expanders configuring a second system by being communicatively coupled to a storage drive, having a plurality of communication ports, and being in cascade connection with the second controller through the communication ports, wherein the first controller accesses the storage drive through at least one of the first expanders in response to the data input/output request, the second controller accesses the storage drive through at least one of the second expanders in response to the data input/output request, the first controller transmits an instruction to execute a diagnosis on the communication ports to the first expanders, the first expanders, upon receiving the instruction, diagnose the communication ports thereof, and the first controller stores a concurrently-executable maximum number being a maximum number of the communication ports concurrently diagnosable in the first system, and causes the first expanders to execute the diagnosis on the communication ports in the first system by repeatedly performing a process of selecting a number of the communication ports not exceeding the concurrently-executable maximum number and a process of transmitting an instruction to perform the diagnosis on the selected communication ports to the first expanders.

Other problems and solutions thereto disclosed in the present specification will be made clear by the descriptions in the section of Description of Embodiments, descriptions of the drawings, and the like.

Advantageous Effects of Invention

According to the present invention, performance degradation of a storage apparatus, due to diagnosis processing performed in a case of a failure, can be prevented.

BRIEF DESCRIPTION OF DRAWINGS

FIG. 9 is an example of port management table 64.

FIG. 13 is an example of a screen for setting maximum number concurrently-executable communication ports 1300.

FIG. 18 is an example of configuration information.

DESCRIPTION OF EMBODIMENTS

<First Embodiment>

Figure 1:
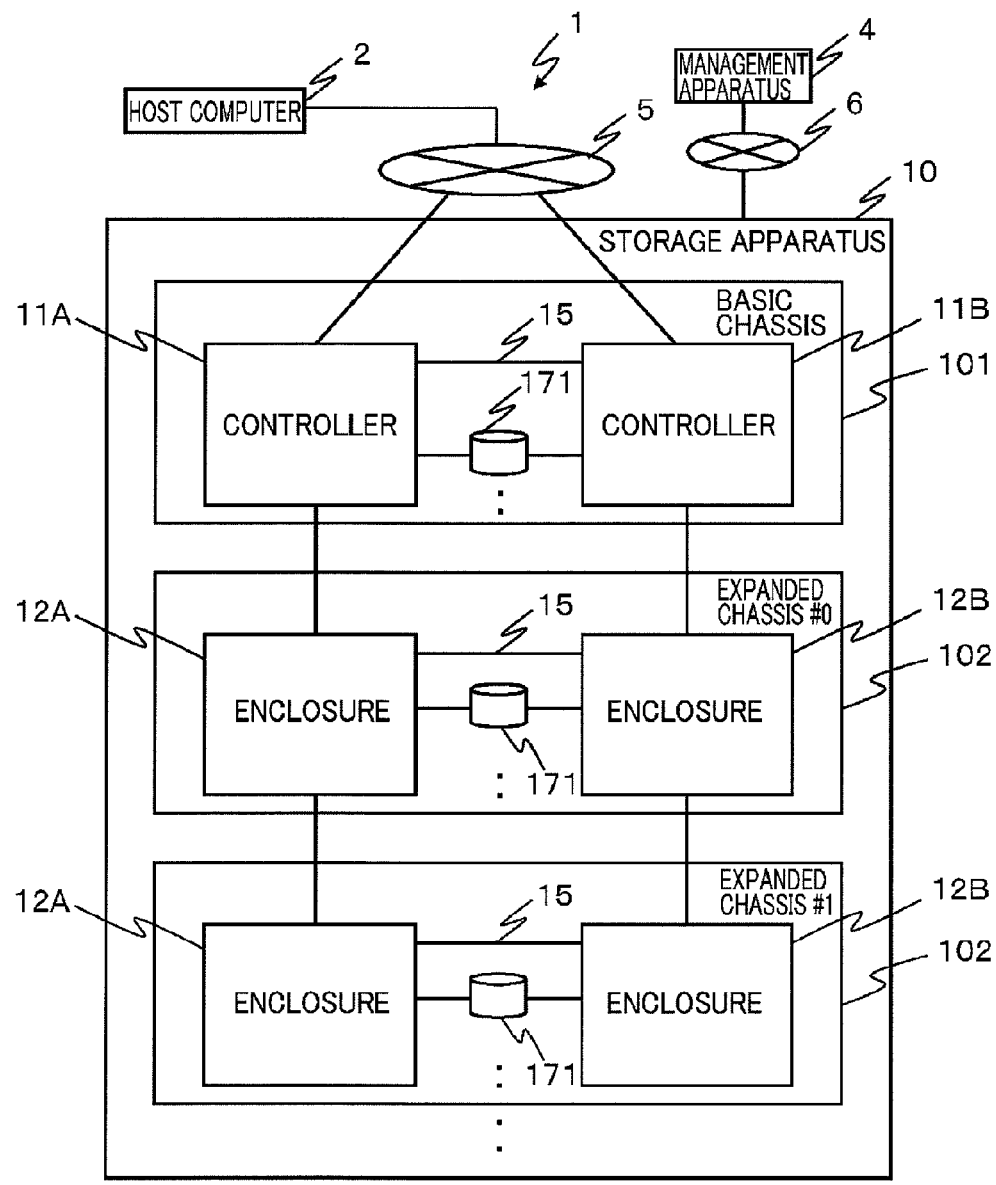
FIG. 1 is a view schematically showing a configuration of storage system 1.

FIG. 1 shows a schematic configuration of a storage system 1 to be described as the first embodiment. As shown in FIG. 1, the storage system 1 includes storage apparatus 10, host computer 2 (external apparatus), and management apparatus 4.

The host computer 2 is, for example, an information apparatus (computer) such as a personal computer or a main frame. For example, the host computer 2 provides services of providing various pieces of information through the Internet, automated teller machine services of banks, or accounting and financing services used in organizations such as corporations.

The storage apparatus 10 is an apparatus, for example, a disk array apparatus and provides a data storage region to application programs and the like executed in the host computer 2.

The host computer 2 is communicatively coupled to the storage apparatus 10 through the first communication network 5. The first communication network 5 is, for example, a LAN (Local Area Network), a WAN (Wide Area Network), a SAN (Storage Area Network), the Internet, a public communication network, a lease line, or the like. Communications between the host computer 2 and the storage apparatus 10 are performed according to a protocol such as TCP/IP, iSCSI (internet Small Computer System Interface), Fibre Channel Protocol, FICON (Fibre Connection) (Registered Trademark), ESCON (Enterprise System Connection) (Registered Trademark), ACONARC (Advanced Connection Architecture) (Registered Trademark), or FIBARC (Fibre Connection Architecture) (Registered Trademark).

The management apparatus 4 is communicatively coupled to the storage apparatus 10 through the second communication network 6. The second communication network 6 is, for example, a LAN, a WAN, the Internet, a public communication network, a lease line, or the like.

The host computer 2 transmits to the storage apparatus 10 a data frame (hereinafter abbreviated as a frame) containing a data input/output request (such as a data write request or a data read request) when accessing the storage region provided by the storage apparatus 10. The frame includes transmission source information and transmission destination information (address information) of the frame, entity of the data to be transferred, response information to the host computer 2, and the like. The frame transmitted from the host computer 2 to the storage apparatus 10 is, for example, a fibre channel frame (FC frame (FC: Fibre Channel)).

Figure 2:
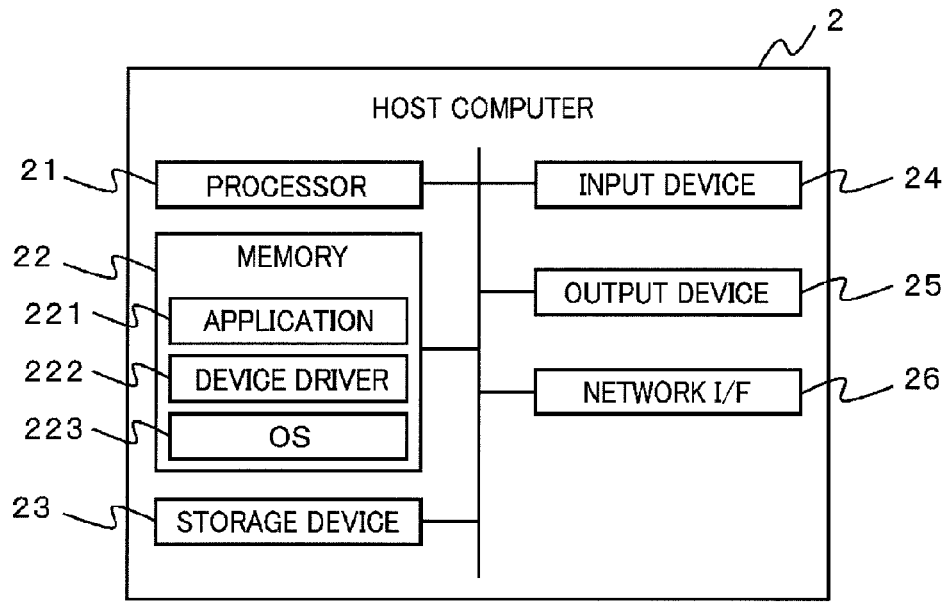
FIG. 2 is a view showing a hardware configuration of host computer 2.

FIG. 2 shows the hardware configuration of the host computer 2. As shown in FIG. 2, the host computer 2 includes processor 21 (CPU (Central Processing Unit), MPU (Micro Processing Unit), or the like), memory 22 (RAM (Random Access Memory), ROM (Read Only Memory), NVRAM (Non volatile RAM or the like), a storage device 23 (HDD (Hard Disk Drive), a semiconductor storage device (SSD (Solid State Drive), or the like), and a network interface (hereinafter referred to as network I/F 26). The network I/F 26 is, for example, HBA (Host Bus Adapter), NIC (Network Interface Card), or the like.

As shown in FIG. 2, the memory 22 (or the storage device 23) of the host computer 2 stores programs such as operating system 223, device driver 222, and application program 221. Various functions of the host computer 2 are implemented by the processor 21 of the host computer 2 reading and executing the program stored in the memory 22 (or the storage device 23).

Figure 3:
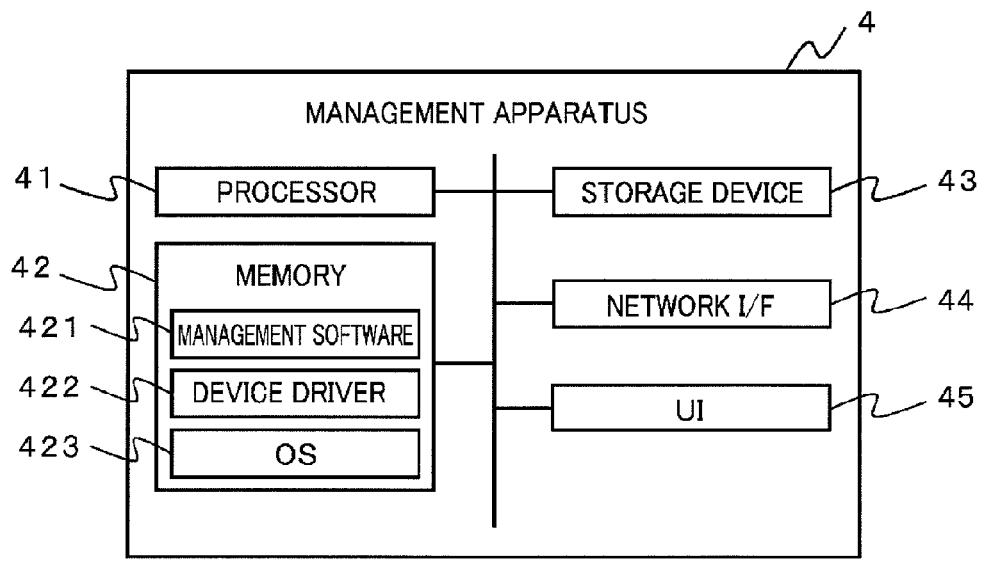
FIG. 3 is a view showing a hardware configuration of management apparatus 4.

FIG. 3 shows the hardware configuration of the management apparatus 4. As shown in FIG. 3, the management apparatus 4 includes processor 41 (such as a CPU or MPU), memory 42 (such as a RAM, ROM, or NVRAM), storage device 43 (such as an HDD or a semiconductor storage device (SDD)), a communication interface (hereinafter referred to as a network I/F 44) (such as NIC), and a user interface (hereinafter referred to as UI 45)(such as a keyboard, mouse, touch panel, liquid crystal monitor, or organic EL panel).

As shown in FIG. 3, the memory 42 (or the storage device 43) of the management apparatus 4 stores programs such as an operating system (hereinafter referred to as OS 423), a device driver 422, and management software 421. The processor 41 of the management apparatus 4 reads and executes the program stored in the memory 42 (or the storage device 43) to implement the various functions of the management apparatus 4.

As shown in FIG. 1, the storage apparatus 10 is configured of a basic chassis 101, and at least one expanded chassis 102 (#0, #1, #2, ... ).

The basic chassis 101 is provided with a controller 11A (also referred to as the first controller) and a controller 11B (second controller) which are redundantly configured, and at least one storage drive 171 which is communicatively coupled to the controllers 11A, 11B. Although not illustrated, the basic chassis 101 also includes a power source and a cooling device (such as a cooling fan).

The expanded chassis 102 includes an enclosure 12A (first enclosure), an enclosure 12B (second enclosure) which are redundantly configured, and at least one storage drive 171 which is communicatively coupled to the enclosures 12A, 12B. Although not illustrated, the expanded chassis 102 also includes a power source and a cooling device (such as a cooling fan).

The storage drive 171 which is mounted on the basic chassis 101 and the expanded chassis 102 is, for example, a hard disk drive (a drive in conformity with standards such as SAS (Serial Attached SCSI), SATA (Serial ATA), FC (Fibre Channel), PATA (Parallel ATA), or SCSI (Small Computer System Interface)), a semiconductor storage device (SDD (Solid State Drive)), or the like.

Figure 4:
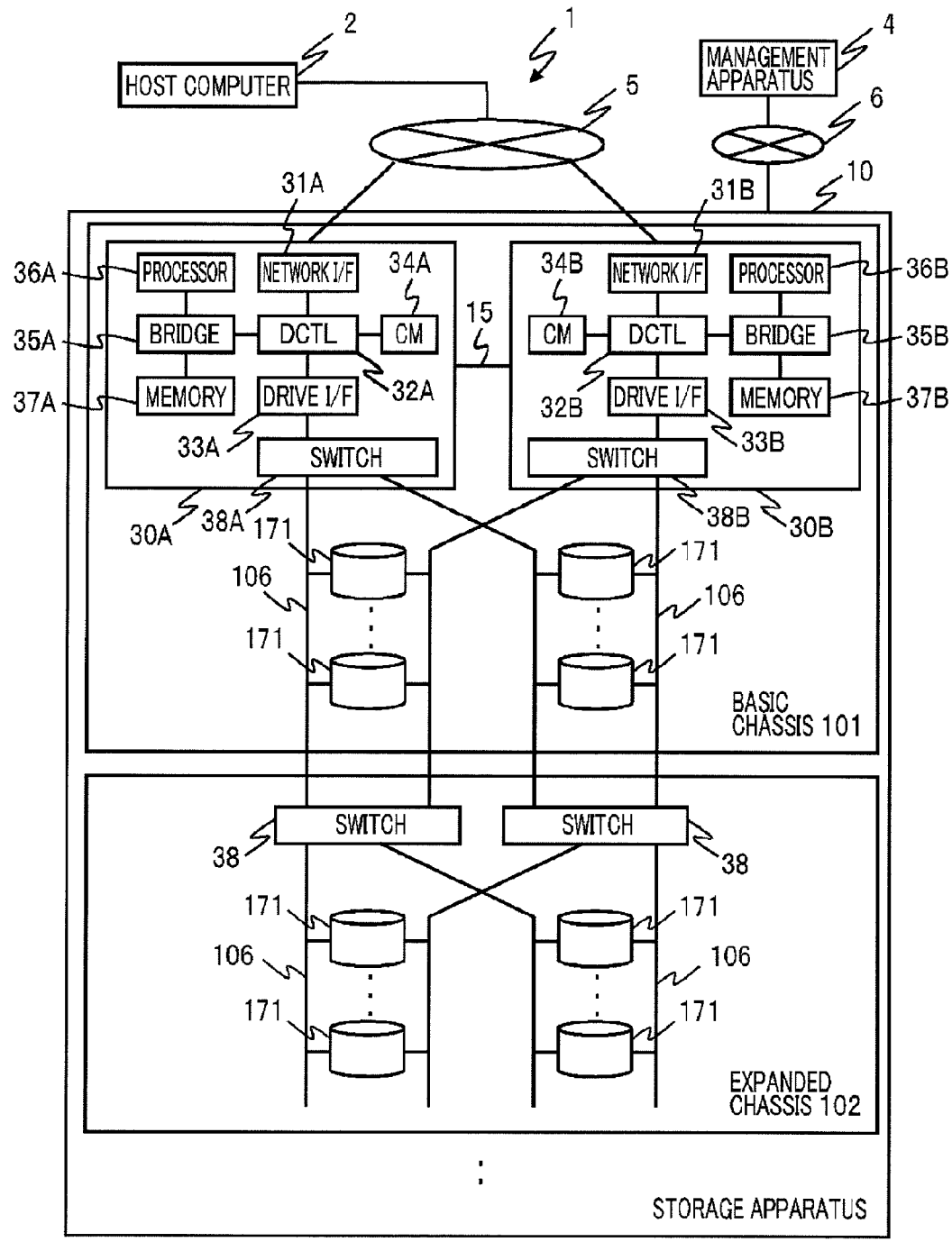
FIG. 4 is a view showing a hardware configuration of storage apparatus 10.

FIG. 4 shows the hardware configuration of the storage apparatus 10. As shown in FIG. 4, the basic chassis 101 includes two controller boards 30A, 30B which are redundantly configured. Of these, the controller board 30A is provided with a network I/F 31A, a data controller (DCTL 32A), a drive interface (drive I/F 33A), a cache memory (CM 34A), a bridge 35A, a processor 36A, a memory 37A, and a switch 38A. The controller board 30B is provided with a network I/F 31B, a data controller (DCTL 32B), a drive interface (drive I/F 33B), a cache memory (CM 34B), a bridge 35B, a processor 36B, a memory 37B, and a switch 38B.

The two controller boards 30A, 30B are communicatively coupled with each other through a communication path 15. Each controller board 30 exchanges information with the other controller board as needed through this communication path 15 to monitor the operational state of the other device (whether or not a failure had occurred, or the like). In addition, a file over cluster may be formed by the controller boards 30A, 30B.

As shown in FIG. 4, the storage drive 171, mounted on each of the basic chassis 101 and the expanded chassis 102, is communicatively coupled to the controller boards 30A, 30B through a communication path such as a fibre channel loop 106.

It should be noted that in the following description, it is assumed that when components configured redundantly are not provided with reference signals "A" and "B", the component generically indicates both of the components redundantly configured.

Figure 5:
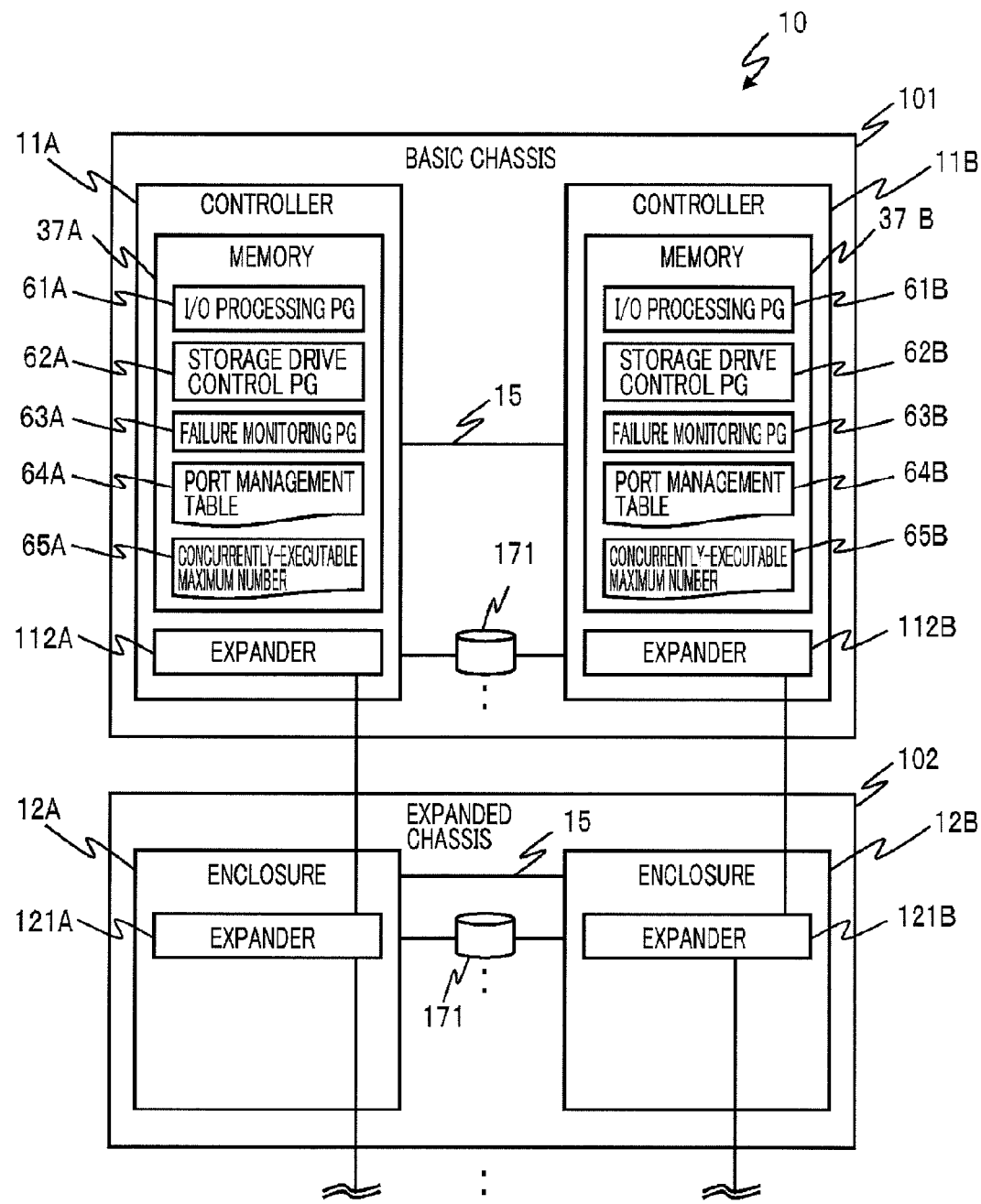
FIG. 5 is a view showing configurations and main functions of controllers 11A, 11B, which are mounted on basic chassis 101, and enclosures 12A, 12B, which are mounted on expanded chassis 102.

FIG. 5 shows the configurations and main functions of the controllers 11A, 11B mounted on the basic chassis 101 and the enclosures 12A, 12B mounted on the expanded chassis 102. As shown in FIG. 5, the controller 11A includes an expander 112A. Similarly, the controller 11B includes an expander 112B.

The enclosure 12A in the expanded chassis 102 includes expander 121A and the enclosure 12B includes expander 121B. As shown in FIG. 5, the expander 121A and the expander 121B are communicatively coupled with each other through a communication path 15.

The expander 121A in each expanded chassis 102 is in cascade connection with the controller 11A (the expander 112A) in the basic chassis 101. Similarly, the expander 121B in the each expanded chassis 102 is in cascade connection with the controller 11B (the expander 112B) in the basic chassis 101.

Hereinafter, a group of devices including the controller 11A (expander 112A) and the expander 121A in cascade connection with the controller 11A is referred to as the first system. Similarly, a group of devices including the controller 11B (expander 112B) and the expander 121B in cascade connection with the controller 11B is referred to as the second system.

The memory 37 of the controller 11 stores programs for implementing each of the functions of an I/O processing program 61, a storage drive control program 62, and a failure monitoring program 63. The processor 36 of the controller board 30 reads and executes a program stored in the memory 37 of the controller board 30 to implement various functions. As shown in the FIG. 5, the memory 37 stores a port management table 64. The port management table 64 is described later in detail.

When receiving a data I/O request transmitted from the host computer 2, the I/O processing program 61 implements a function to transmit to the expanders 112, 121, an access request to the storage drive 171. In addition, the I/O processing program 61 implements a function to transmit to the host computer 2 as needed, a response to the processing for the data I/O request (such as read data, a read completion report, a write completion report).

In the process relating to the data I/O request, the I/O processing program 61 implements a function to perform staging or destaging of, for example, data to be written in the storage drive 171 (hereinafter referred to as write data) or data to be read from the storage device 171 (hereinafter referred to as read data) to and from the cache memory (CM 34A (or CM 34B)).

In addition, the I/O processing program 61 implements a function to transmit to the expanders 112, 121, an access request to the storage drive 171 (hereinafter referred to as a drive access request). The I/O process program 61 also implements a function to receive a response which is transmitted by the expanders 112, 121 in response to the drive access request. The response includes data read from the storage drive 171, a report indicating that the reading from the storage drive 171 has completed, a report indicating that the writing to the storage drive 171 has completed, or the like.

The storage drive control program 62 implements functions related to the control of the storage drive 171 (for example, control related to RAID (Redundant Arrays of Inexpensive (or Independent) Disks)) system (redundancy system)) or management of the configuration information of the storage drive 171 (the management of the installation state of the storage drive 171 or management of RAID configuration information).

The failure monitoring program 63 implements a function relating to failure monitoring and failure response to the expanders 112A, 112B provided in the controller 11 in the basic chassis 101, the expanders 121A, 121B provided in the enclosure 12 in the expanded chassis 102, and the storage drive 171 coupled to the basic chassis 101 and the expanded chassis 102.

(Expander) The expanders 112A, 121A (or the expanders 112B, 121B) have functions as relay devices (switching devices) for communications performed between the memory 37 of the controller 11 and the storage drive 171.

The expanders 112A, 121A (or the expanders 112B, 121B) function as an initiator or a target in SMP (Serial Management Protocol), SSP (Serial SCSI protocol), or STP (Serial ATA tunneling protocol).

Figure 6:
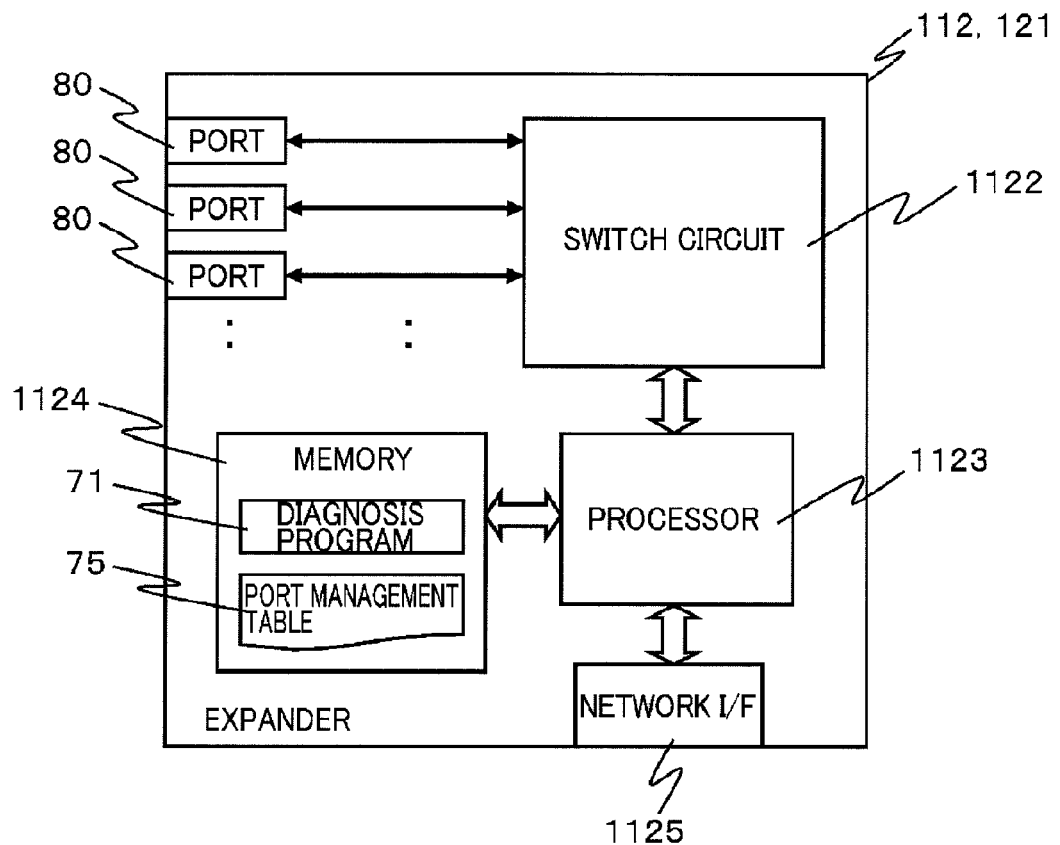
FIG. 6 is a view showing a hardware configuration of expanders 112A, 121A (or expanders 112B, 121B).

FIG. 6 shows the hardware configuration of the expanders 112A, 121A (or the expanders 112B, 121B). As shown in FIG. 6, the expanders 112A, 121A (or the expanders 112B, 121B) include a plurality of communication ports 80, a switch circuit 1122, processor 1123, memory 1124, and network I/F 1125.

Among these, the communication ports 80 (Phy) include serial-parallel conversion circuits such as SerDes (Serializer/DeSrializer).

The switch circuit 1122 includes ECR (Expander Connection Router) that controls data transfer (a frame transfer) between the communication ports 80 according to transmission source information or transmission destination information included in the frame, ECM (Expander Connection Manager) for performing processing regarding settings of routing and zoning, BPP (Broadcast Primitive Processor), and the like.

The BPP monitors the insertion or removal of the storage drive 171 coupled to the communication ports 80, the presence or non-presence of a physical link (Linkup/Linkdown), the presence or non-presence of a communication failure, or the change of states of the switch circuit 1122 and the device coupled to the switch circuit 1122, and the states of communication thereto. When detecting the change of state, the BPP transmits a broadcast frame through the communication ports 80 as needed.

The processor 1123 sets and controls the switch circuit 1122 according to the setting of routing, the setting of zoning, the contents of the port management table 75 to be described later, and the like stored in the memory 1124. In addition, the processor 1123 communicates with other expanders 112, 121 through the network I/F 1125 to receive/transmit information regarding the monitoring or control from/to the other expanders 112, 121.

The memory 1124 stores a diagnosis program 71 and a communication port management table 75. The diagnosis program 71 is read and executed as needed by the processor 1123 to implement a function regarding the diagnosis on the communication ports 80 of the expanders 112, 121.

Figures 7, 8:
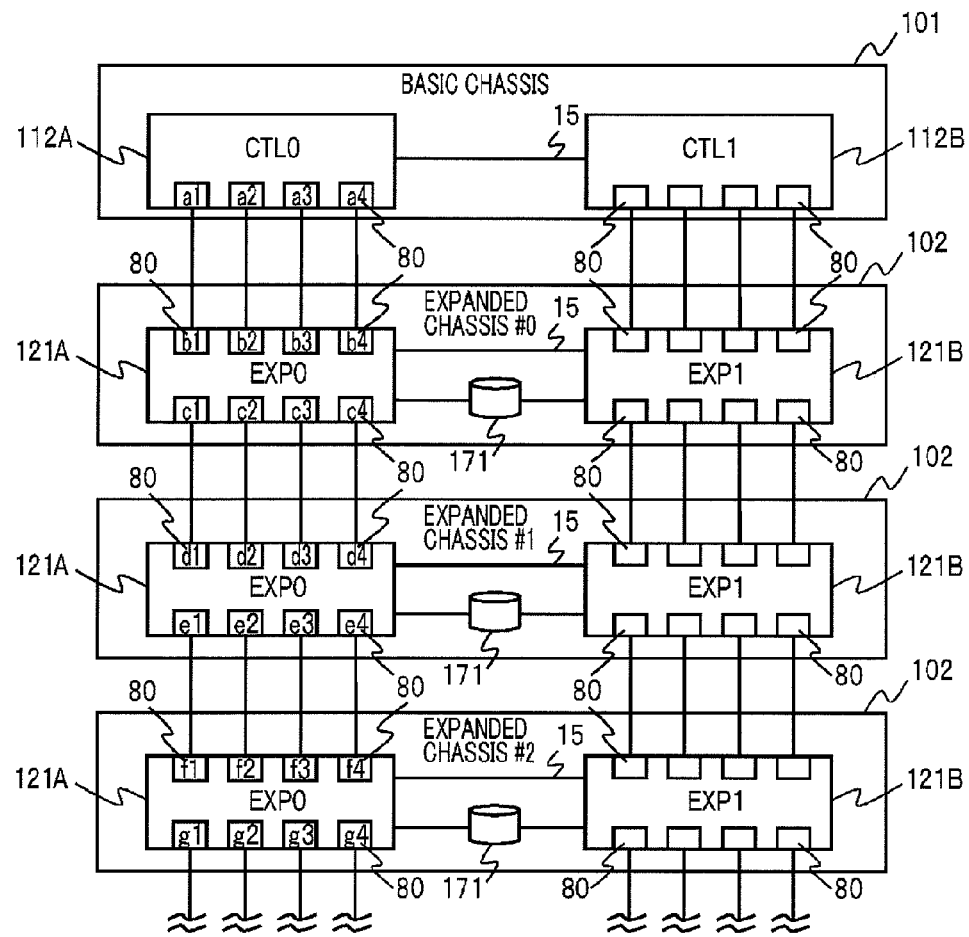
FIG. 7 is an example of a coupled state of communication ports 80 provided in each of the expanders 112A, 121A (or the expanders 112B, 121B).
FIG. 8 is an example of communication port management table 75.

FIG. 7 shows an example of a coupling state of the communication ports 80 provided in each of the expanders 112A, 121A (or the expanders 112B, 121B). In this example, the expanders 112A, 112B in the basic chassis 101 each includes four communication ports 80. The expanders 121A, 121B in the expanded chassis (#0, #1, #2, . . . ) each includes eight communication ports 80.

FIG. 8 shows an example of the communication port management table 75. As shown in FIG. 8, the communication port management table 75 manages the operation mode currently set for the communication ports 80 of the expanders 112, 121, and the accumulated number of failure occurrences (hereinafter referred to as error counter value) detected in the past for each communication port 80.

The operation mode includes an I/O mode and a diagnosis mode. When the communication ports 80 are used for frame transfer in response to the data I/O request received from the host computer 2, the I/O mode is set. When the communication ports 80 are to be diagnosed, the diagnosis mode is set. The communication ports 80 in the diagnosis mode cannot be used for frame transfer in response to the data I/O request. In other words, when the frame regarding the I/O request received from the host computer 2 arrives at a certain communication port 80, the processor 1123 (or the switch circuit 1122) transfers a frame using (through) another communication port 80 in an I/O mode.

The operation mode of the communication ports 80 provided in each of the expanders 112, 121 can be set through the controllers 11A, 11B. The controllers 11A, 11B transmit to the expanders 112, 121, an identifier of a communication port 80 (hereinafter referred to as port ID) and a setting command for an operation mode, which specifies the operation mode of that communication port 80. When receiving the setting command, the expanders 112, 121 set an operation mode of the designated communication port 80 on the communication port management table 75 to the specified operation mode.

The expanders 112, 121 perform a loopback test as needed on the communication port 80 set in the diagnosis mode as a diagnosis target. Specifically, the expanders 112, 121 create test data used for the loopback test and perform the loopback of the created test data between the communication port 80 as the diagnosis target and the communication port 80 coupled thereto.

For example, in the configuration shown in FIG. 7, when the expander 112A (CTL0) transmits a loopback command to the communication port 80 (a1), a loopback test is performed between the communication port 80 (a1) and the communication port 80 (b1) coupled thereto. Similarly, for example, when the expander 121A (EXP0) transmits a loopback command to the communication port 80 (c1), a loop back test is performed between the communication port 80 (c1) and the communication port 80 (d1) coupled thereto.

When it is detected that an error had occurred in a certain communication port 80, the expanders 112, 121 update the error counter value of that communication port in the communication port management table 75. It should be noted that an update function for the error counter value can be implemented by the diagnosis program 71 or can be implemented as a function of the hardware of the expanders 112, 121.

The contents of the port management table 75 stored in the memory 1124 of each of the expanders 112, 121 are transmitted as needed (at predetermined timing, periodically, every time any event occurs or the like) to the controller 11 and consolidated in the port management table 64 in the controller 11. The contents of the port management table 75 are transmitted to the controller 11 from the expanders 112, 121 in response to a request from the controller 11 or are spontaneously transmitted from the expanders 112, 121.

FIG. 9 shows an example of the port management table 64 of the controller 11 in which the contents of the port management table 75 stored in the memory 1124 of each of the expanders 112, 121 are consolidated. As shown in FIG. 9, the port management table 64 manages the error counter value and current operation mode of each communication port 80 (Port ID) included in each of the expanders 112, 121 (expander ID) in each chassis (chassis ID). It should be noted that "Priority" shown in FIG. 9 is described later in detail.

(Diagnosis Processing)

The controller 11 of the storage apparatus 10 monitors in real time whether or not a failure occurrence notification (such as a communication failure or a hardware failure) has been received from the expander 112 of the controller 11 or the expander 121 of the enclosure 12. When a failure occurrence notification is received, the controller 11 starts diagnosis on communication ports 80 of each of the expanders 112, 121 in the system under the controller 11.

When a diagnosis on the communication ports 80 is executed, the number of communication ports 80 usable to process the data I/O requests transmitted from the host computer 2 is limited. Thus, the process performance of the storage apparatus 10 may decline, and, accordingly, services to the host computer 2 may be affected (such as deterioration of throughput performance). For this reason, the storage apparatus 10 in the present embodiment includes a mechanism to control diagnosis so that the number of the communication ports 80 concurrently diagnosable does not exceed a predetermined number (hereinafter referred to as a concurrently-executable maximum number).

The controller 11 sequentially selects communication ports 80 not more than the concurrently-executable maximum number from the communication ports 80 of the expanders 112, 121 in the system under the controller 11, sets the selected communication ports 80 to the diagnosis mode, and then causes the expanders 112, 121 to diagnose these communication ports 80. The communication ports 80 are selected according to, for example, a priority set for each communication port 80 based on an increase rate of the error counter value.

After diagnosing the communication port 80, the expanders 112, 121 notify the controller 11 of the diagnosis result. The controller 11 provides the diagnosis result of each communication port 80 notified from the expanders 112, 121 to the management apparatus 4 as needed.

Figure 10:
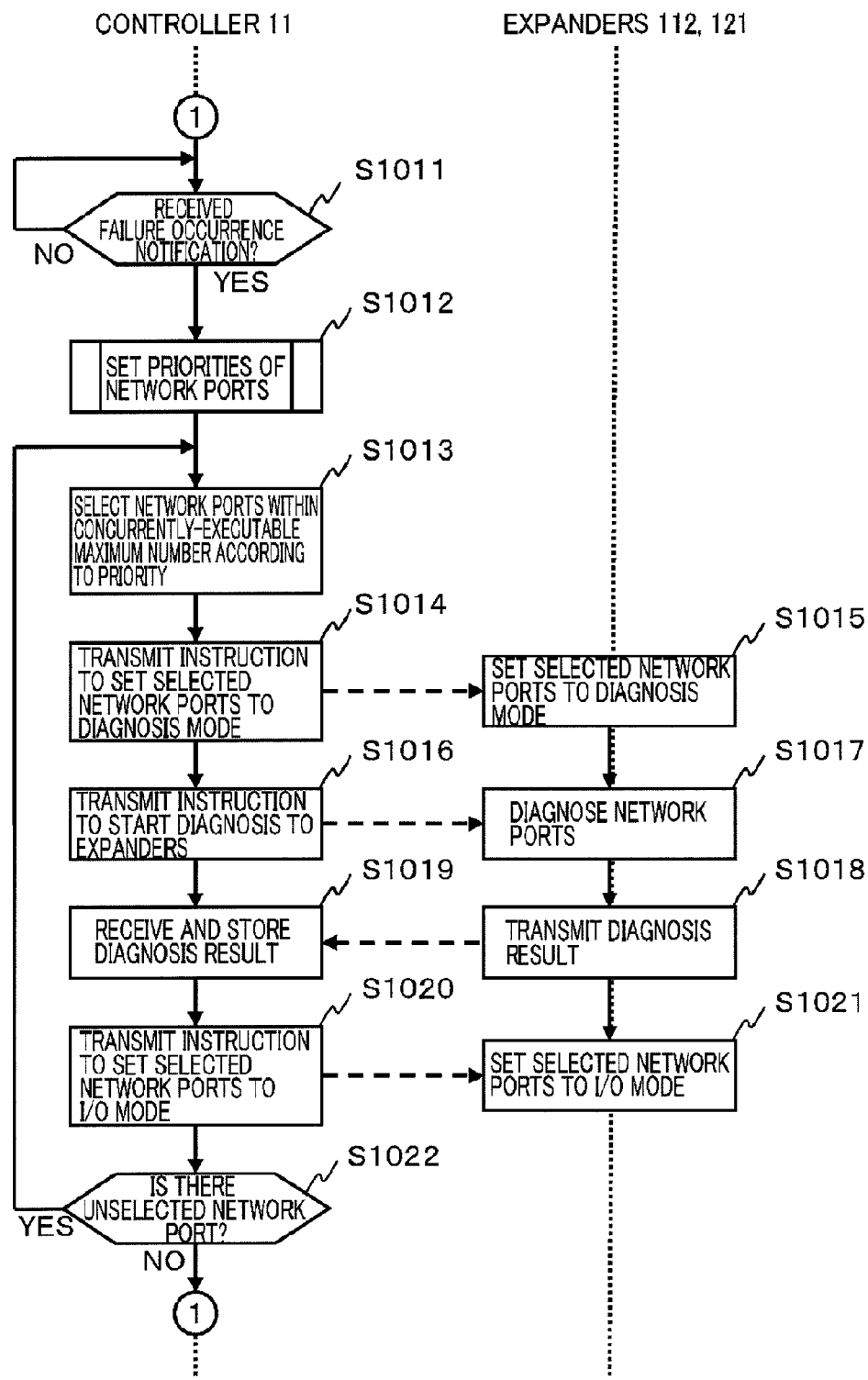
FIG. 10 is a flowchart for illustrating diagnosis process S1000.

FIG. 10 is a flowchart for illustrating the process performed in the storage apparatus 10 when the communication ports 80 of the expanders 112, 121 are diagnosed (hereinafter referred to as diagnosis process S1000). Description is given with reference to FIG. 10.

As shown in FIG. 10, the controller 11 monitors in real time whether or not a failure occurrence notification (such as a communication failure or a hardware failure) is received from the expanders 112, 121 (S1011). When a failure occurrence notification is received (S1011: YES), the controller 11 starts diagnosing the communication ports 80 of each of the expanders 112, 121 in the system under the controller 11.

Upon starting diagnosis of the communication ports 80, the controller 11 firstly sets priorities (priorities for determining the order of diagnosis on the communication ports) of the communication ports 80 of each of the expanders 112, 121 in the system under the controller 11 (S1012). The setting of the priorities is performed based on, for example, an increase rate of the error counter value of each communication port 80, but it may be set by any other method (for example, in an ascending or descending order of the port IDs). The priorities may be set before the failure occurrence is notified.

Figure 11:
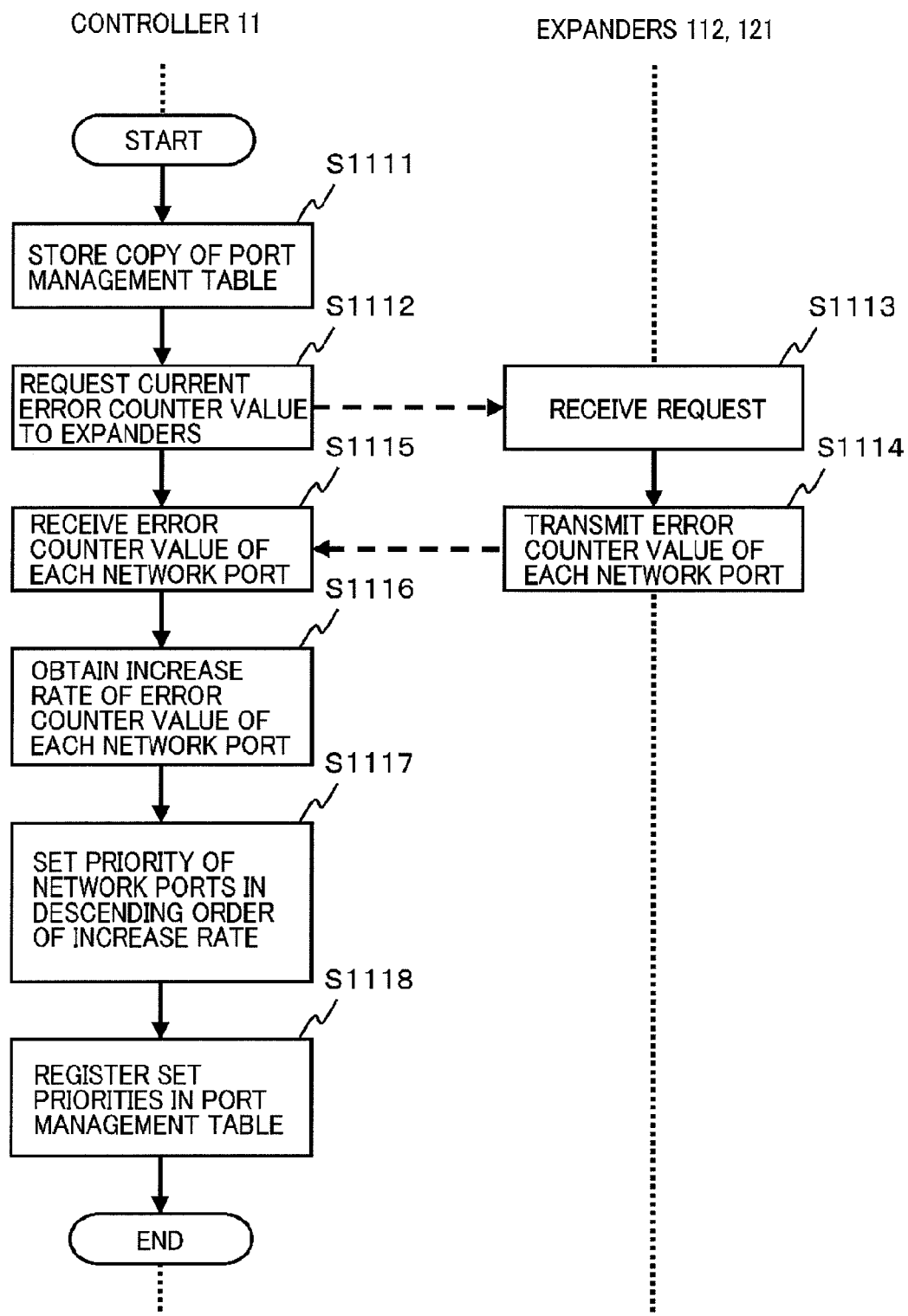
FIG. 11 is a flowchart for illustrating priority setting process S1100.

FIG. 11 is an example of a process which is performed in the storage apparatus 10 when the priority is set based on the increase rate of the error counter value of each communication port 80 (hereinafter referred to as priority setting process S1100).

As shown in FIG. 11, the controller 11 firstly stores (backups) a copy of the contents of the current port management table 64 (S1111). Subsequently, the controller 11 acquires the current error counter value of each communication port 80 from each of the expanders 112, 121 (S1112 to S1115).

Thereafter, the controller 11 obtains an increase rate of the error counter value of each communication port 80 based on the difference between the acquired current error counter value of each communication port 80 and the content of the copied port management table 64 (S1116). Then, the controller 11 sets a priority of each communication port 80 so that higher priority is given to the communication port 80 with higher increase rate (S1117) and registers the set priority in the port management table 64 (S1118). It should be noted that for the communication ports 80 with the same increase rates, priorities are set based on the descending or ascending order of the identifiers of the communication ports 80.

Returning to FIG. 10, at S1013, the controller 11 selects communication ports 80 with highest priorities within the concurrently-executable maximum number from the communication ports 80 of the expanders 112, 121 in the system under the controller 11.

Figure 12:
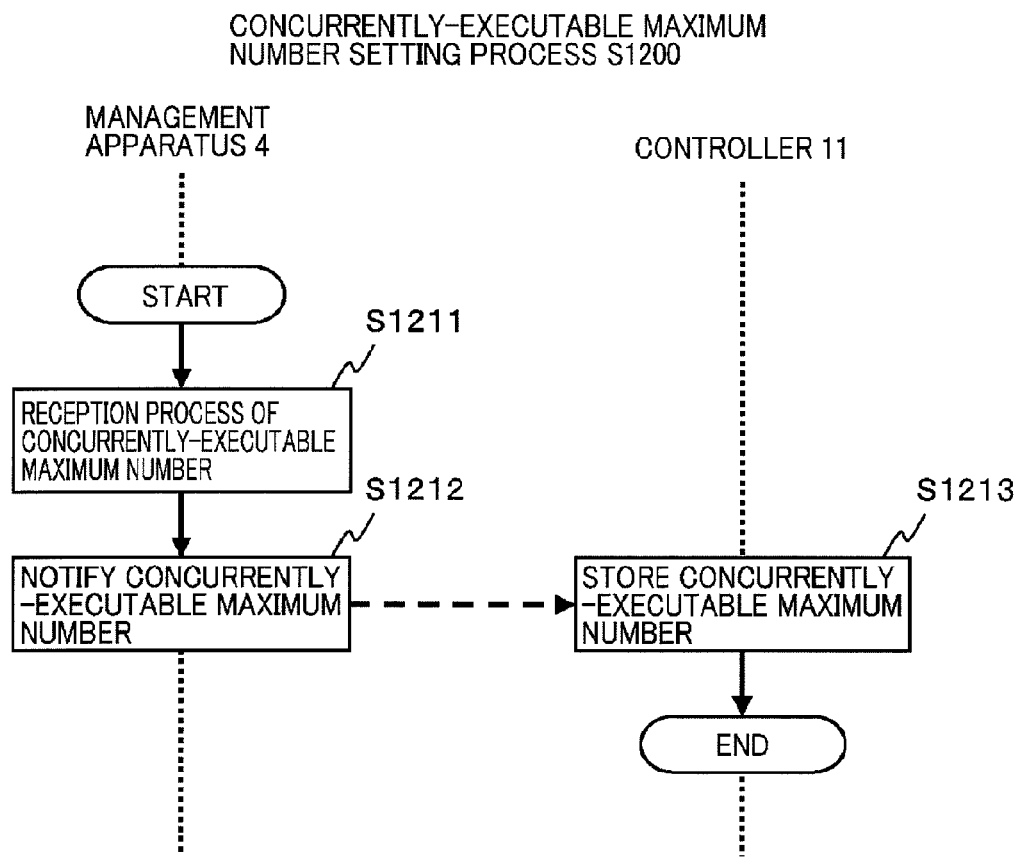
FIG. 12 is a flowchart for illustrating the process of setting a maximum number of concurrently-executable communication ports S1200.

The concurrently-executable maximum number is set by, for example, a user operating UI 45 of the management apparatus 4. The set concurrently-executable maximum number is notified from the management apparatus 4 to the controller 11. FIG. 12 is an example of a process performed in the management apparatus 4 and the controller 11 when the user sets the concurrently-executable maximum number using the management apparatus 4 (hereinafter referred to as concurrently-executable maximum number setting process S1200). As shown in FIG. 12, when the user operates the management apparatus 4 so that a function to set the concurrently-executable maximum number is started, the management apparatus 4 displays a screen on which a concurrently-executable maximum number is set (hereinafter referred to as concurrently-executable maximum number setting screen 1300) and receives specification of the concurrently-executable maximum number (S1211).

Subsequently, the management apparatus 4 notifies the controller 11 of the determined concurrently-executable maximum number (S1212). When receiving the concurrently-executable maximum number transmitted from the management apparatus 4, the controller 11 stores this concurrently-executable maximum number in the memory 37 (S1213).

FIG. 13 shows an example of the concurrently-executable maximum number setting screen 1300. As shown in FIG. 13, the screen is provided with fields from which any one of "High speed", "Medium speed", and "Low speed" is selected. When a user selects any one of these, the management apparatus 4 determines a concurrently-executable maximum number according to the designation. For example, when the user selects "High speed", the management apparatus 4 determines the concurrently-executable maximum number to be "1". When the user selects "Medium speed", the management apparatus 4 determines the concurrently-executable maximum number to be "2". When the user selects "Low speed", the management apparatus 4 determines the concurrently-executable maximum number to be "3".

It should be noted that as the concurrently-executable maximum number increases, the storage apparatus 10 is more affected by the load produced by diagnosing the communication ports 80. The user can appropriately set the concurrently-executable maximum number through the concurrently-executable maximum number setting screen 1300 in consideration with the balance between the speed of the diagnosis and the effect of the diagnosis on the operation of the host computer 2.

Returning to FIG. 10, at S1014, the controller 11 transmits an instruction (command), to set the communication ports 80 selected at S1013 (hereinafter referred to as target communication ports 80) to the diagnosis mode, to the expanders 112, 121 in which the target communication ports 80 are present (hereinafter referred to as target expanders 112, 121) (S1014). When receiving the instruction, the target expanders 112, 121 set the target communication ports 80 to the diagnosis mode (S1015), and set "Diagnosis mode" in the operation mode of the target communication ports 80 in the port management table 75 of the controller 11.

Subsequently, the controller 11 transmits an instruction to start diagnosing the target communication ports 80 to the target expanders 112, 121 (S1016). When receiving the instruction, the target expanders 112, 121 start diagnosing the communication ports 80 (S1017). This diagnosis is performed by, for example, loopback of the test data between the target communication ports 80 and the communication ports 80 coupled thereto.

When the diagnosis on the target communication ports 80 is completed, the target expanders 112, 121 transmit the diagnosis result to the controller 11 (S1018). Upon receiving the diagnosis result, the controller 11 registers the result in the port management table 64 (S1019). It should be noted that the diagnosis result registered in the port management table 64 is provided to the management apparatus 4 as needed.

Thereafter, the controller 11 transmits an instruction, to set the target communication ports 80 to the I/O mode, to the target expanders 112, 121 (S1020). Upon receiving the instruction, the target expanders 112, 121 set the target communication ports 80 to the I/O mode (S1021) and sets "I/O mode" in the operation mode of the target communication modes 80 in the port management table 75. As described above, the target communication ports 80 return to the I/O mode immediately after the diagnosis is completed. Thus, performance degradation of the storage apparatus 10 due to the diagnosis can be suppressed.

After that, the controller 11 determines whether or not an unselected communication port 80 at S1013 is present (S1022). The step returns to S1013 when it is present (S1022: YES), and the step returns to S1011 when it is not (S1022: NO).

As described above, the storage apparatus 10 selects a number of communication ports 80 not exceeding the concurrently-executable maximum number and causes the expanders 112, 121 to diagnose the selected communication ports 80. Thus, the performance of the storage apparatus 10 can be prevented from deteriorating and the effects of the diagnosis processing on the host computer 2 can be suppressed.

In addition, the storage apparatus 10 sets a priority for each of the communication ports 80 based on the number of failure occurrences so that the diagnosis is executed by selecting the communication ports 80 with highest priorities within the concurrently-executable maximum number. Thus, the communication ports 80 in which a failure has most likely occurred (having larger number of failure occurrences) can be preferentially diagnosed. Accordingly, the cause of the failure can be quickly specified.

(I/O Process During Diagnosis)

When a frame related to the data I/O request received from the host computer 2 arrives at a communication port 80 (the communication port 80 which is in the I/O mode) of the expanders 112, 121, the expanders 112, 121 transfer the received frame to other expanders 112, 121 through other communication ports 80 (communication ports 80 which is in the I/O mode) thereof.

Figure 14:
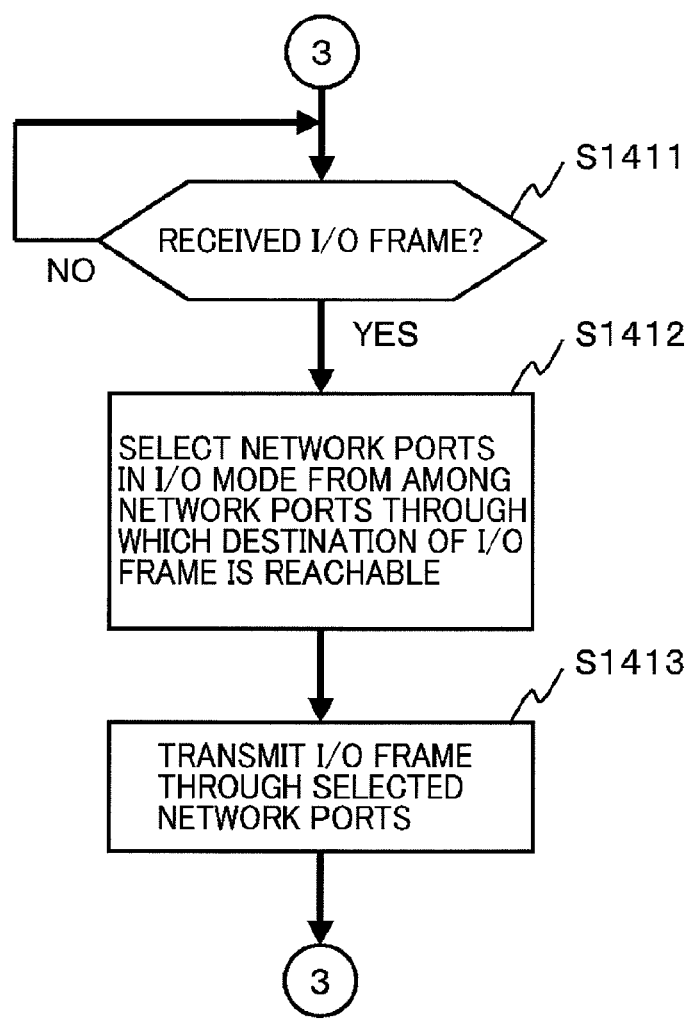
FIG. 14 is a flowchart for illustrating I/O frame transfer process S1400.

FIG. 14 is a view illustrating a process performed by the expanders 112, 121 when a certain communication port 80 of the expanders 112, 121 receives the I/O frame (hereinafter referred to as I/O frame transfer processing S1400). The I/O frame transfer processing S1400 is described below with reference to FIG. 14.

The expanders 112, 121 monitor in real time whether or not the I/O frame has arrived at a communication port 80 thereof (S1411). When detecting that the I/O frame has arrived at the communication port 80 thereof (S1411: YES), the expanders 112, 121 select a communication port 80 which is currently in the I/O mode among the communication ports 80 which are coupled to a destination of the received I/O request (S1412) and transmit the arrived I/O frame through the selected communication port 80.

(Specific Examples)

Figure 15:
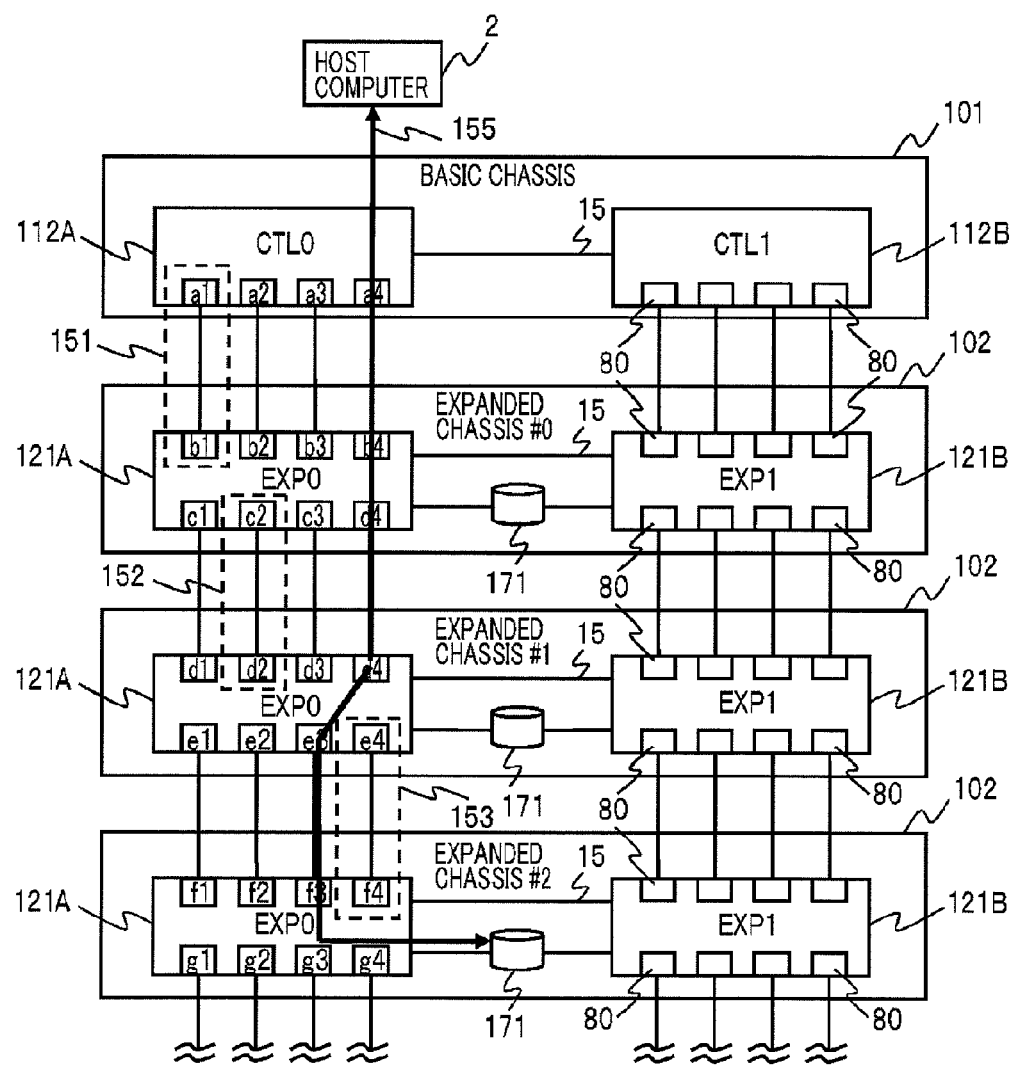
FIG. 15 is a view schematically showing how the diagnosis process S1000 is executed.

FIG. 15 is a view schematically showing the state where the diagnosis process S1000 is executed when concurrently-executable maximum number 65 is set to "1". As shown in FIG. 15, in this case, for example, a loopback test is performed between communication ports 80 with port IDs "a1" and "b1" (reference numeral 151), and subsequently a loopback test is performed between communication ports 80 with port IDs "c2" and "d2" (reference numeral 152). Furthermore, a loopback test is performed between communication ports 80 with port IDs "e4" and "f4" (reference numeral 153).

In this case, for example, the I/O frame whose destination is the storage drive 171 in expanded chassis #2 follows the path (the path connecting the communication ports 80 with port IDs of "a4", "b4", "c4", "d4", "e3", and "f3" in this order) shown by the bold line (reference numeral 155). Thus, during diagnosis, a path through which the destination of the I/O frame is reachable from a source is surely secured.

Figure 16:
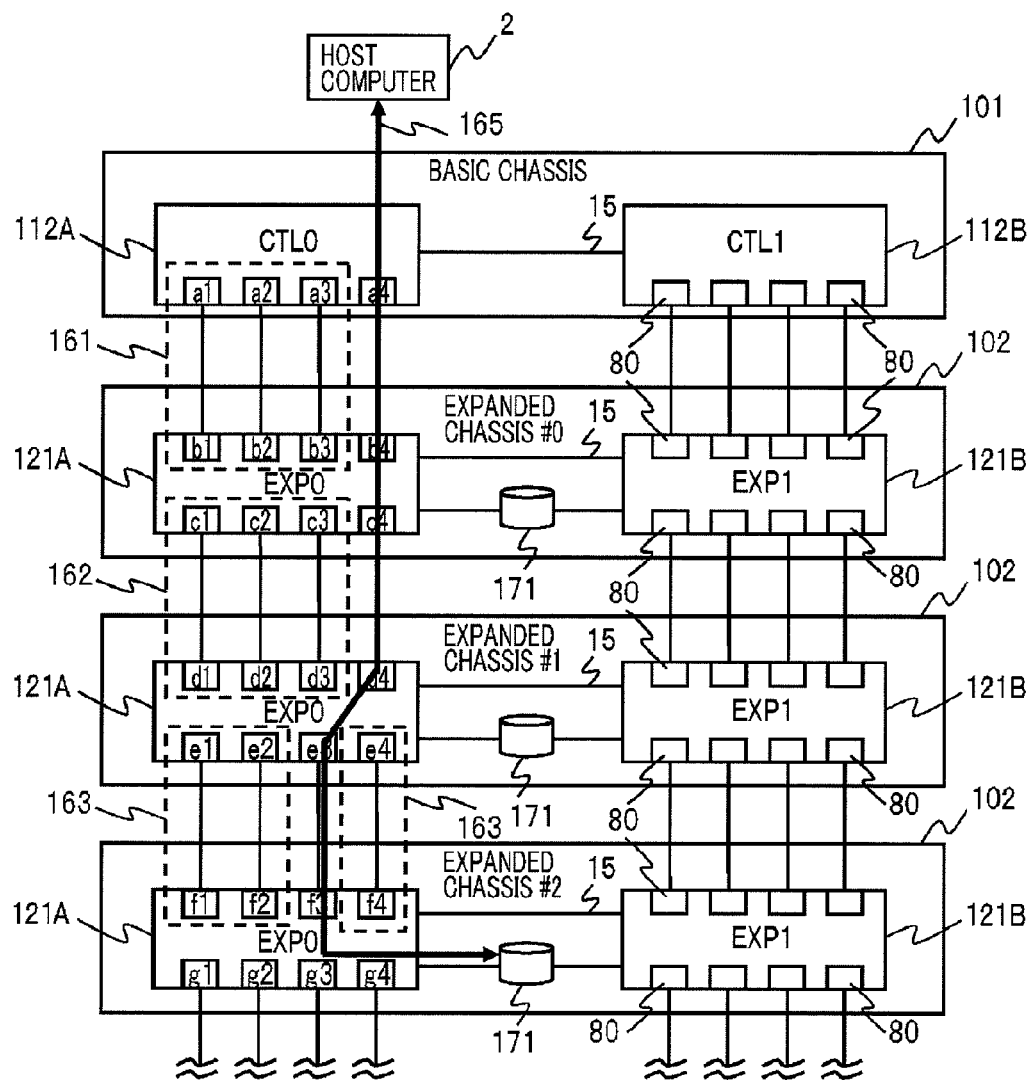
FIG. 16 is a view schematically showing how the diagnosis process S1000 is executed.

FIG. 16 is a view schematically showing the state where a diagnosis is executed when the concurrently-executable maximum number 65 is set to "3". As shown in FIG. 16, in this case, for example, loopback tests are concurrently performed between communication ports 80 with port IDs "a1" and "b1", between communication ports 80 with port IDs "a2" and "b2", and between communication ports 80 with port IDs "a3" and "b3" (reference numeral 161). Subsequently, the loopback tests are concurrently performed between communication ports 80 with ports IDs "c1" and "d1", between communication ports 80 with port IDs "c2" and "d2", and between communication ports 80 with port IDs "c3" and "d3" (reference numeral 162). Thereafter, loopback tests are concurrently performed between communication ports 80 with port IDs "e1" and "f1", between communication ports 80 with port IDs "e2" and "f2", and between communication ports 80 with port IDs "e4" and "f4" (reference numeral 163).

In this case, for example, the I/O frame whose destination is the storage drive 171 in expanded chassis #2 follows the path (the path connecting the communication ports 80 whose port IDs are "a4", "b4", "c4", "d4", "e3", and "f3" in this order) shown by the bold line (reference numeral 165). Thus, even during diagnosis, a path through which a destination of the I/O frame is reachable from a source is surely secured.

When it is assumed that the expander 112 in the basic chassis 101 is at the uppermost stream, if the set concurrently-executable maximum number 65 is larger than the number of the communication ports 80 coupled on the upper stream side or lower stream side of the expanders 112, 121, the path between the upper stream side and lower stream side of the expanders 112, 121 may be temporarily blocked and thus, the performance of the storage apparatus 10 may be greatly affected.

Figure 17:
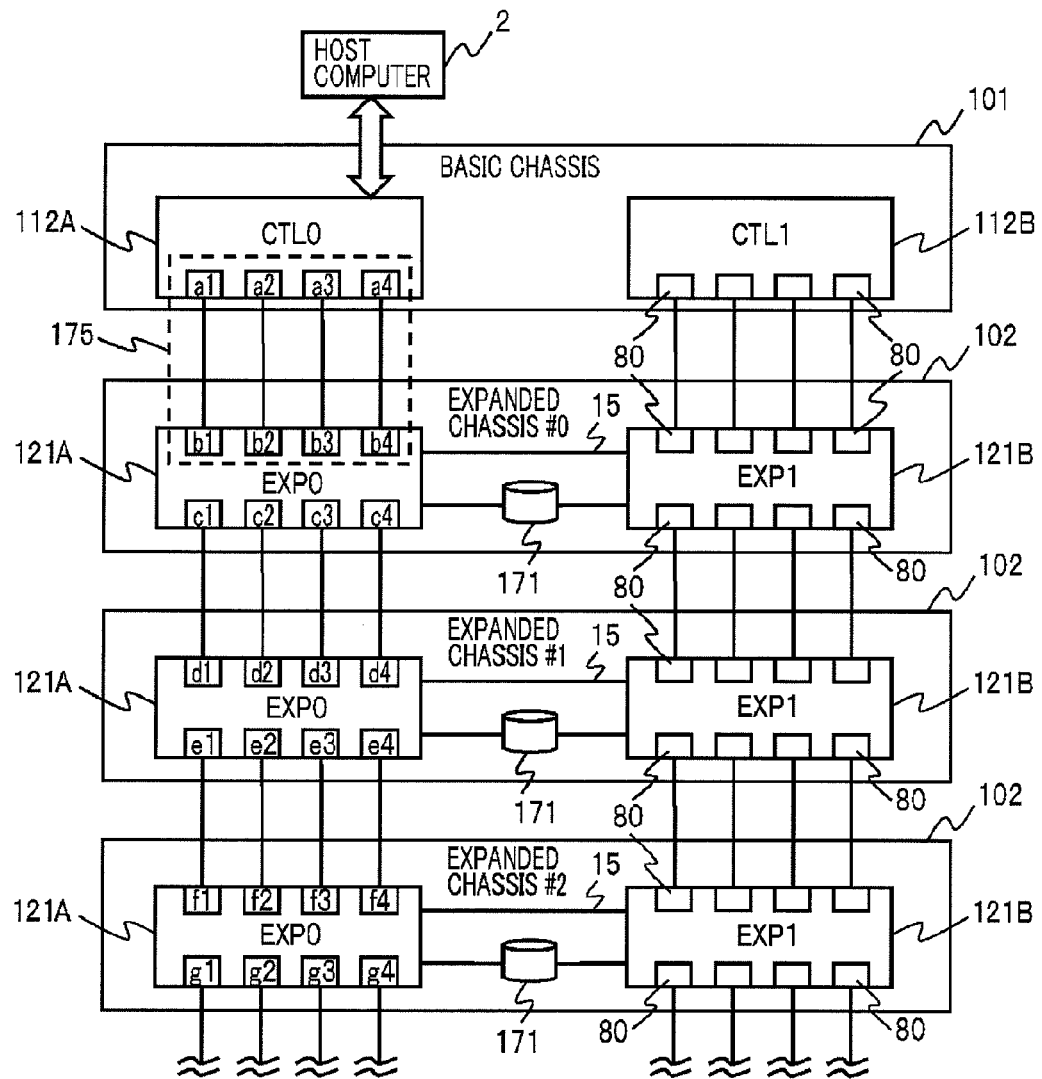
FIG. 17 is a view schematically showing how the diagnosis process S1000 is executed.

For example, FIG. 17 shows the state where a diagnosis is executed when the concurrently-executable maximum number 65 is set to "4". As shown in FIG. 17, when the loopback test is performed between all the communication ports 80 shown by reference numeral 175, the path connecting the expander 112 in the basic chassis 101 and the expander 121 in the expanded chassis #0 is temporarily blocked.

For this reason, when the concurrently-executable maximum number 65 is set larger than the number of communication ports 80 coupled to the upper stream side or the lower stream side of the expanders 112, 121, the coupled state (coupling relationship) of the communication ports 80 of each of the expanders 112, 121 are stored in the memory 37 of the controller 11 as configuration information, for example. Then, the controller 11 selects the communication ports 80 on which the loopback tests are performed concurrently so that the path connecting the upper and lower stream sides is surely provided. FIG. 18 shows an example of the above-mentioned configuration information.

Figure 19:
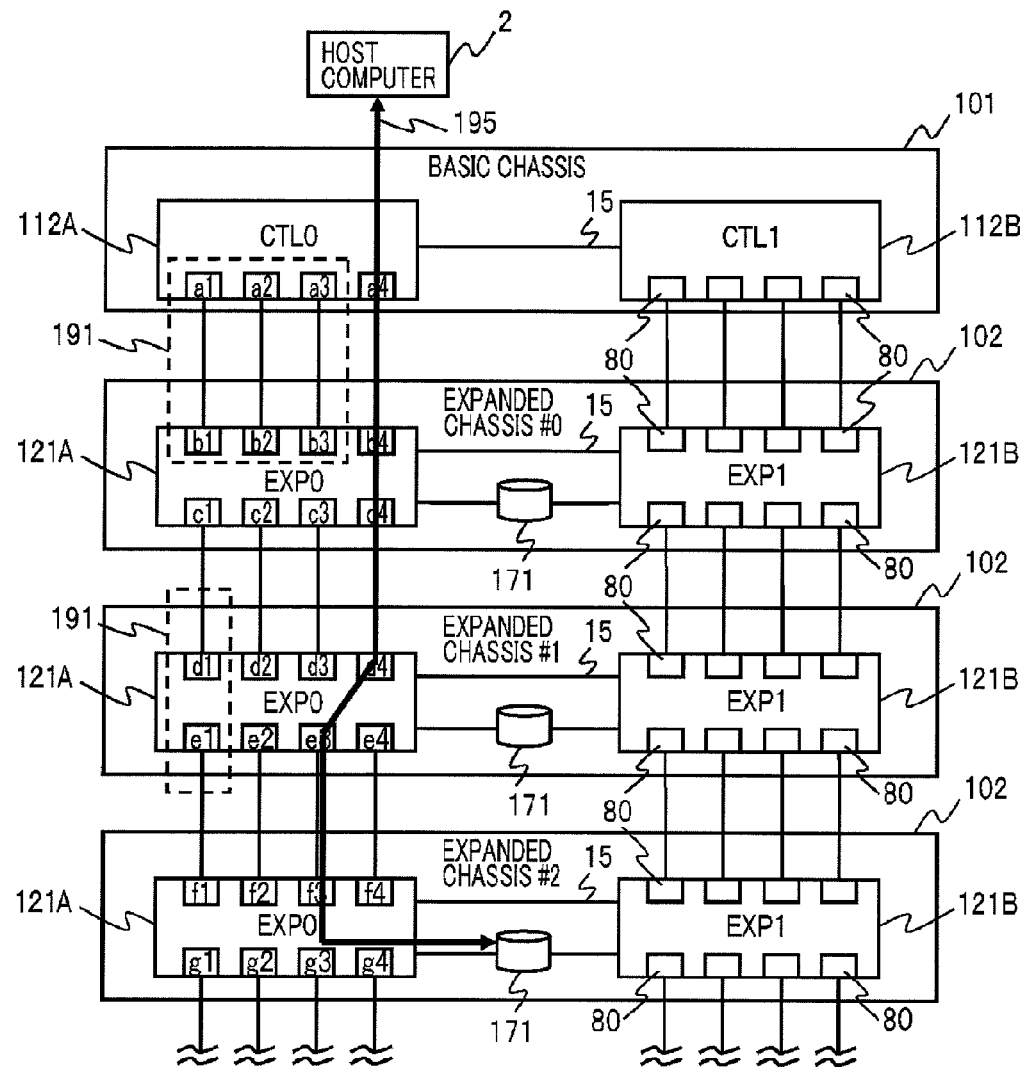
FIG. 19 is a view schematically showing how the diagnosis process S1000 is executed.

FIG. 19 shows an example in which the communication ports 80 between which the loopback tests are concurrently performed are selected so that at least one path coupling the upper stream side and lower stream side is left in each of the expanders 112, 121 (reference numeral 191). In this example, during the loopback test, the expander 112 in the basic chassis 101 leaves a communication port 80 in the I/O mode (the communication port 80 with port ID "a4") which is coupled to the lower stream side therein and the expander 121 in the expanded chassis 102 leaves a communication port 80 in the I/O mode (the communication port 80 with port ID "b4") which is coupled to the upper stream side of the expander 121 therein.

As described above, in the storage apparatus 10 of the present embodiment, a path from the controller 11 to the storage drive 171 is surely provided during the diagnosis. Thus, the performance in the first system can be prevented from deteriorating due to the diagnosis. Thus, the effects of the diagnosis on the performance of the communication ports 80 of the storage apparatus 10 can be suppressed.

It should be noted that in addition to the above-described method, it can be designed that a concurrently-executable maximum number cannot be set larger than the number of the communication ports 80 coupled with the upper stream side or lower stream side of the expanders 112, 121 (input limiting) when, for example, a user sets the concurrently-executable maximum number through the user interface in the management apparatus 4.

<Second Embodiment>

A failure occurrence notification may be notified from the expanders 112, 121 to the controller 11 while diagnosing the communication ports 80 (S1012 to S1022 in FIG. 10). When the failure occurrence notification is transmitted from the expanders 112, 121 to the controller 11 while the communication ports 80 are diagnosed in this way, there is a high probability that some kind of failure has occurred in the communication ports 80 in the I/O mode at that time. In this case, a cause of the failure can be more efficiently specified when diagnosis is performed only on the communication ports 80 currently in the I/O mode.

For this reason, in the second embodiment, when the controller 11 further receives a failure occurrence notification from the expanders 112, 121 during the diagnosis of the communication ports 80 (S1012 to S1022 in FIG. 10), the controller 11 stops diagnosis on the communication ports 80 currently in the diagnosis mode and starts a diagnosis whose target is the communication ports 80 currently in the I/O mode.

Figure 20:
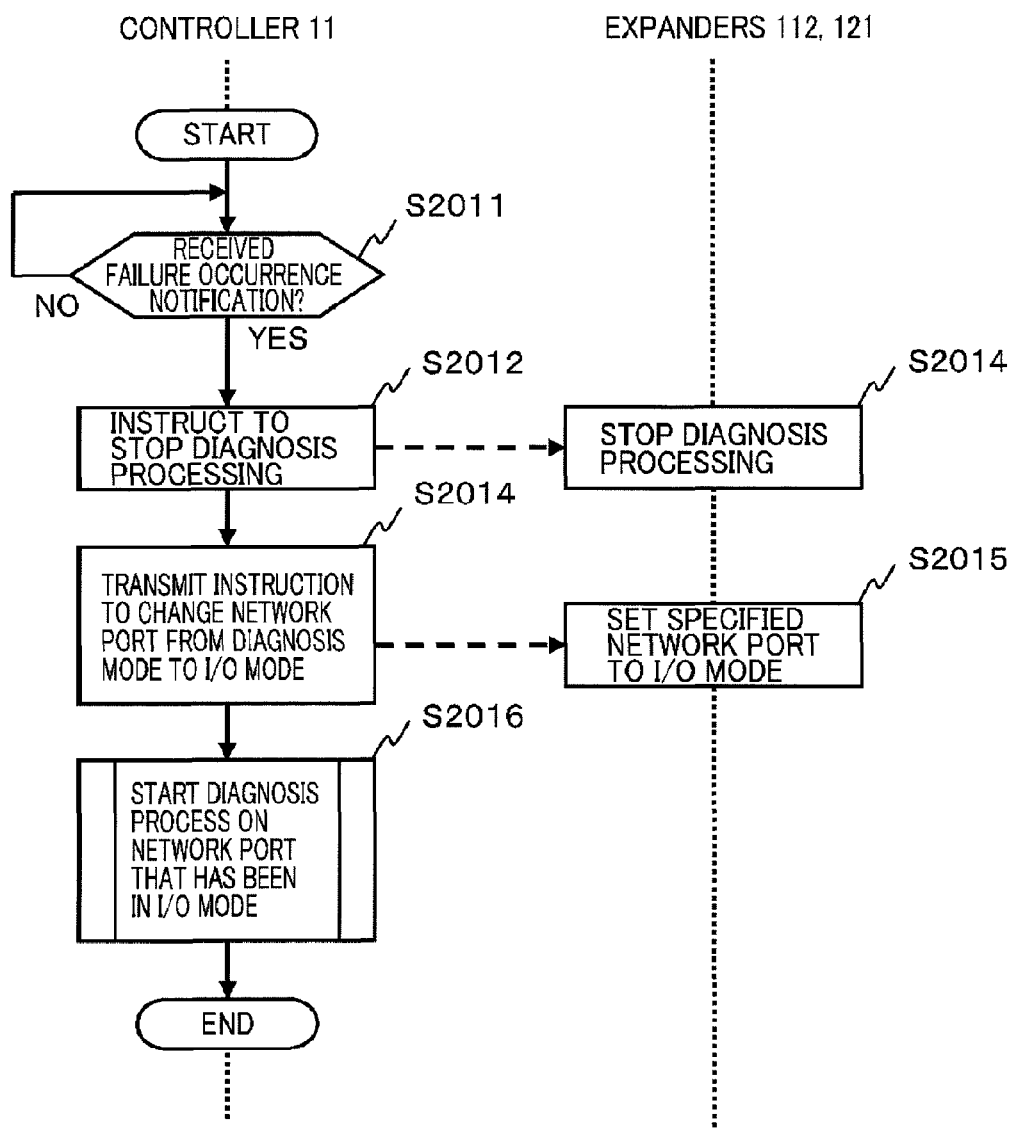
FIG. 20 is a flowchart for illustrating diagnosis target switching process S2000.

FIG. 20 is a flowchart for illustrating the process performed in the storage apparatus 10 in this case (hereinafter referred to as diagnosis target switching process S2000). In the following, description is given with reference to FIG. 20.

The controller 11 monitors in real time whether or not a failure occurrence notification has been received from the expanders 112, 121 (S2011) when the diagnosis is performed on the communication ports 80 (S1012 to S1022 in FIG. 10). When receiving a failure occurrence notification from the expanders 112, 121 (S2011: YES), the controller 11 stops the currently-executing diagnosis on the communication ports 80 (S2012, S2013) and transmits an instruction to the expanders 112, 121 to change the communication ports 80 from the diagnosis mode to the I/O mode (S2014).

When receiving the instruction, the expanders 112, 121 set the communication ports 80 currently in the diagnosis mode, to the I/O mode (S2015) and set "I/O mode" as the operation mode of those communication ports 80 on the port management table 75.

Subsequently, the controller 11 starts diagnosis for the communication ports 80 on the communication ports 80 (S1012 to S1022 in FIG. 10) other than those in the I/O mode (S2016).

As described above, in a case where a failure occurrence notification is transmitted from the expanders 112, 121 to the controller 11 during diagnosis of the communication ports 80, the controller 11 stops diagnosis on the communication ports 80 currently in the diagnosis mode and starts diagnosis on the communication ports 80 currently in the I/O mode. Thus, a cause of the failure can be efficiently specified.

<Third Embodiment>

Figure 21:
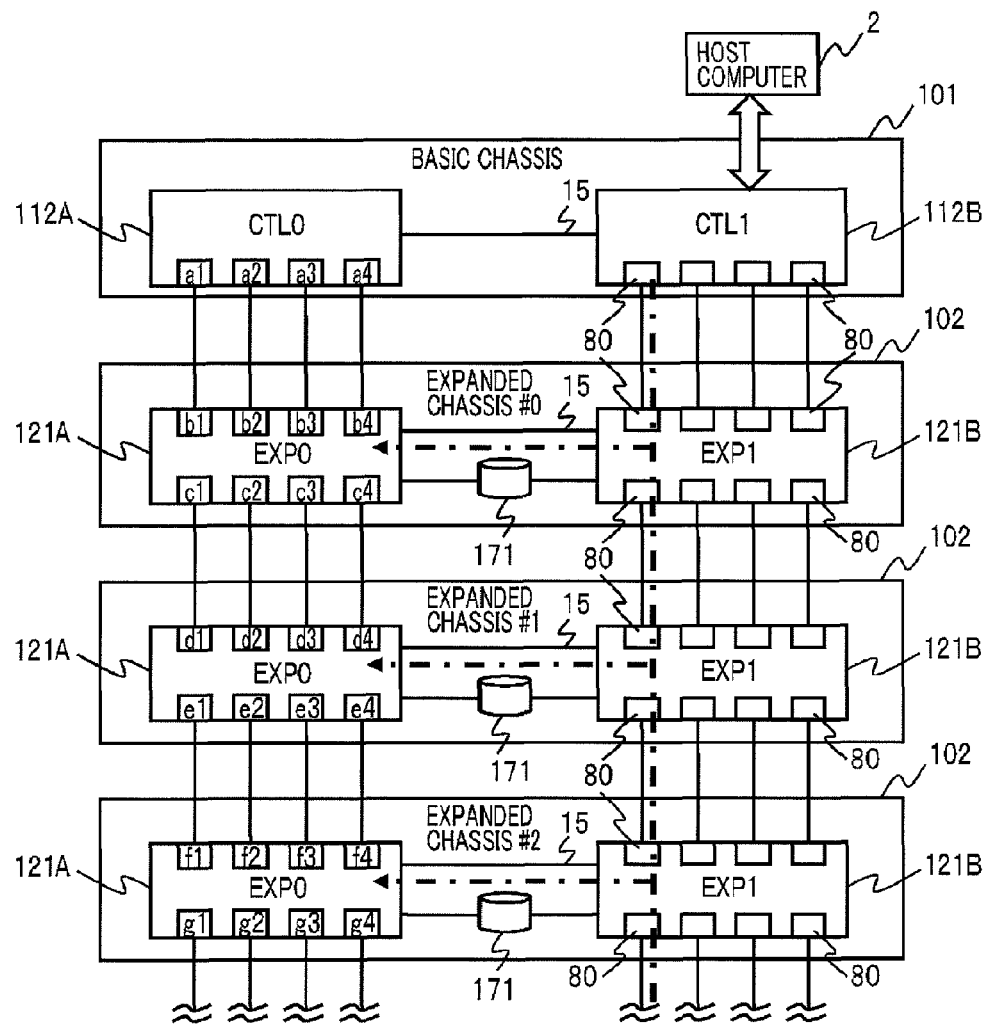
FIG. 21 is a view for illustrating a third embodiment.

In the third embodiment, in a case where a failure occurs in the first system to which one of the two controllers 11 redundantly configured belongs (here controller 11A is assumed), as shown in FIG. 21, the other controller 11B gives an instruction to expanders 112A, 121A which belong to the first system through a communication path 15 connecting the expanders 112A, 121A in the first system and the expanders 112B, 121B in the second system. Accordingly, the controller 11B in the second system mainly functions to cause the expanders 112A, 121A in the first system to diagnose communication ports 80.

Figure 22:
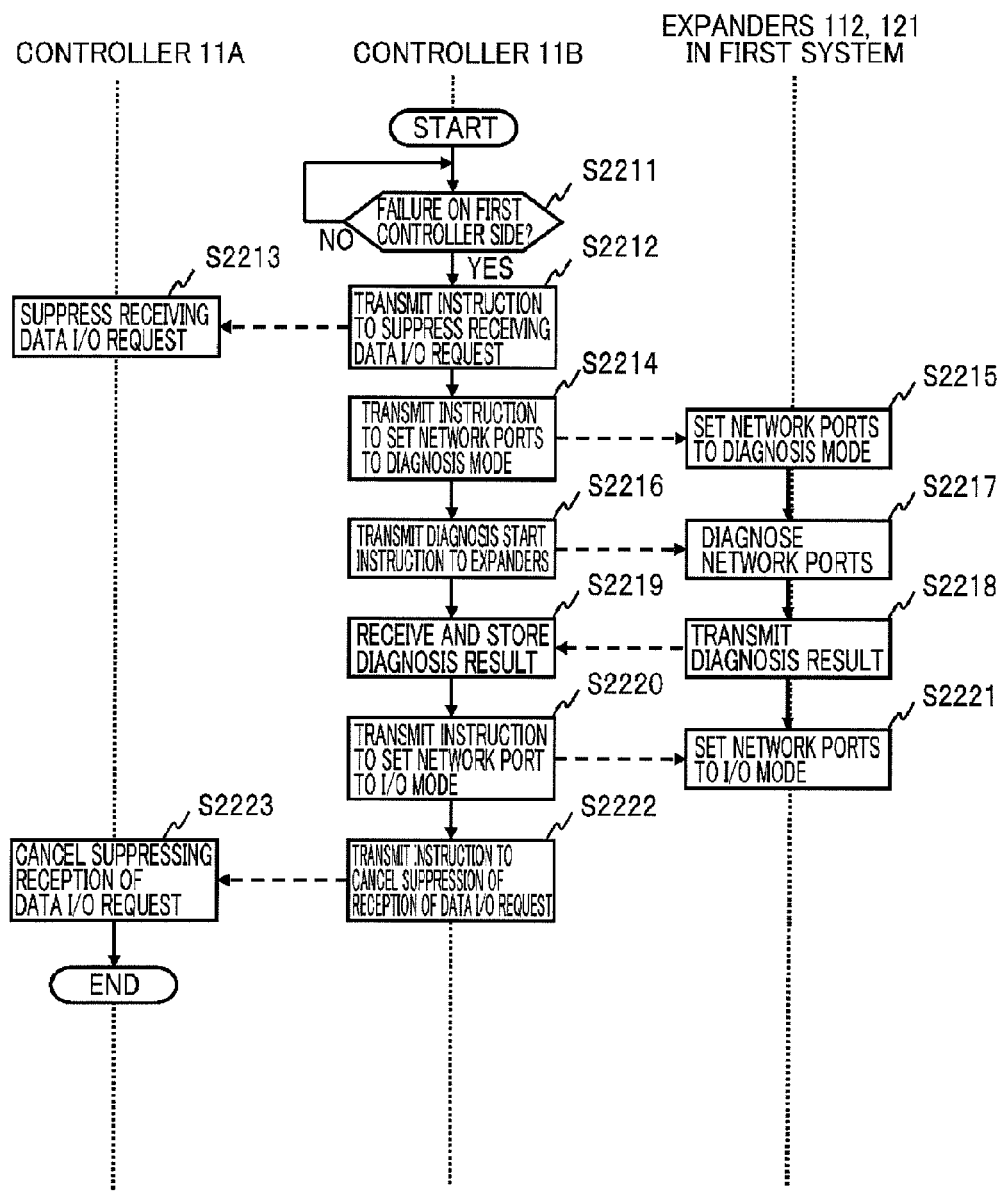
FIG. 22 is a flowchart for illustrating the other of the systems diagnosis process S2200.

FIG. 22 is a flowchart illustrating a process performed in the storage apparatus 10 in the third embodiment (hereinafter referred to as other of the systems diagnosing process S2200). In the following, description is given with reference to FIG. 22.

As shown in FIG. 22, the controller 11B monitors in real time whether or not a failure had occurred in the first system (S2211). Note that for example, the controller 11B determines whether or not a failure had occurred in the first system based on information transmitted from the controller 11A through the communication path 15.

Upon detection of a failure in the first system (S2211: YES), the controller 11B transmits to the controller 11A through the communication path 15 an instruction to suppress (stop) the reception of data I/O requests transmitted from the host computer 2 (S2212). When receiving the instruction, the controller 11A suppresses (stops) reception of data I/O requests transmitted from the host computer 2 (S2213).

Subsequently, the controller 11B transmits to the expanders 112, 121 in the first system through the communication path 15 an instruction to set each communication port 80 (but communication ports 80 used as the communication path 15 are excluded) to the diagnosis mode (S2214). When receiving the instruction, the expanders 112A, 121A in the first system set the communication ports 80 thereof to the diagnosis mode (S2215). It should be noted that when this setting is made, the expanders 112A, 121A set "Diagnosis mode" as the operation mode of those communication ports 80 on the port management table 75.

Thereafter, the controller 11B transmits an instruction to start a diagnosis on the communication ports 80 to the expanders 112A, 121A in the first system through the communication path 15 (S2216). When receiving the instruction, the expanders 112A, 121A start a diagnosis on the communication ports 80 thereof (S2217) and transmits the diagnosis result to the controller 11B through the communication path 15 (S2218). When receiving the diagnosis result, the controller 11B registers the received result in the port management table 64 (S2219).

Then, the controller 11B transmit an instruction to set the communication ports 80 to the I/O mode to the expanders 112, 121 in the first system through the communication path 15 (S2220). When receiving an instruction, the expanders 112A, 121A set the communication ports 80 thereof to the I/O mode(S2221). In this setting, the expanders 112A, 121A set "I/O mode" as the operation mode of those communication ports 80 on the port management table 75.

After that, the controller 11B transmits to the controller 11A through the communication path 15, an instruction to restart the reception of the data I/O request transmitted from the host computer 2 (S2222). When receiving the instruction, the controller 11A restarts reception of the data I/O request transmitted from the host computer 2 (S2223).

As described above, in the third embodiment, when a failure occurs in the first system, the controller 11B in the second system mainly functions to cause the expanders 112A, 121A in the first system to diagnose the communication ports 80. Thus, the normal controller 11B in the second system can surely cause the expanders 112A, 121A in the first system to diagnose the communication ports 80.

In the above processing, it is also possible that the controller 11B controls the expanders 112, 121 in the first system to perform the diagnosis described in the first embodiment (the process from S1012 to S1022 in FIG. 10). Thus, similar to the first embodiment, the path coupling the destination of the I/O frame and the source is secured during the diagnosis (the process from S1012 to S1022 in FIG. 10). Thus, the performance of the storage apparatus 10 can be prevented from declining. Accordingly, the effects of the load of the diagnosis on the communication ports 80, on the host computer 2 can be suppressed. In addition, there is no need to suppress the reception of data I/O requests on the first system side (the controller 11A) during the diagnosis (S2212, S2213 in FIG. 22).

Figure 23:
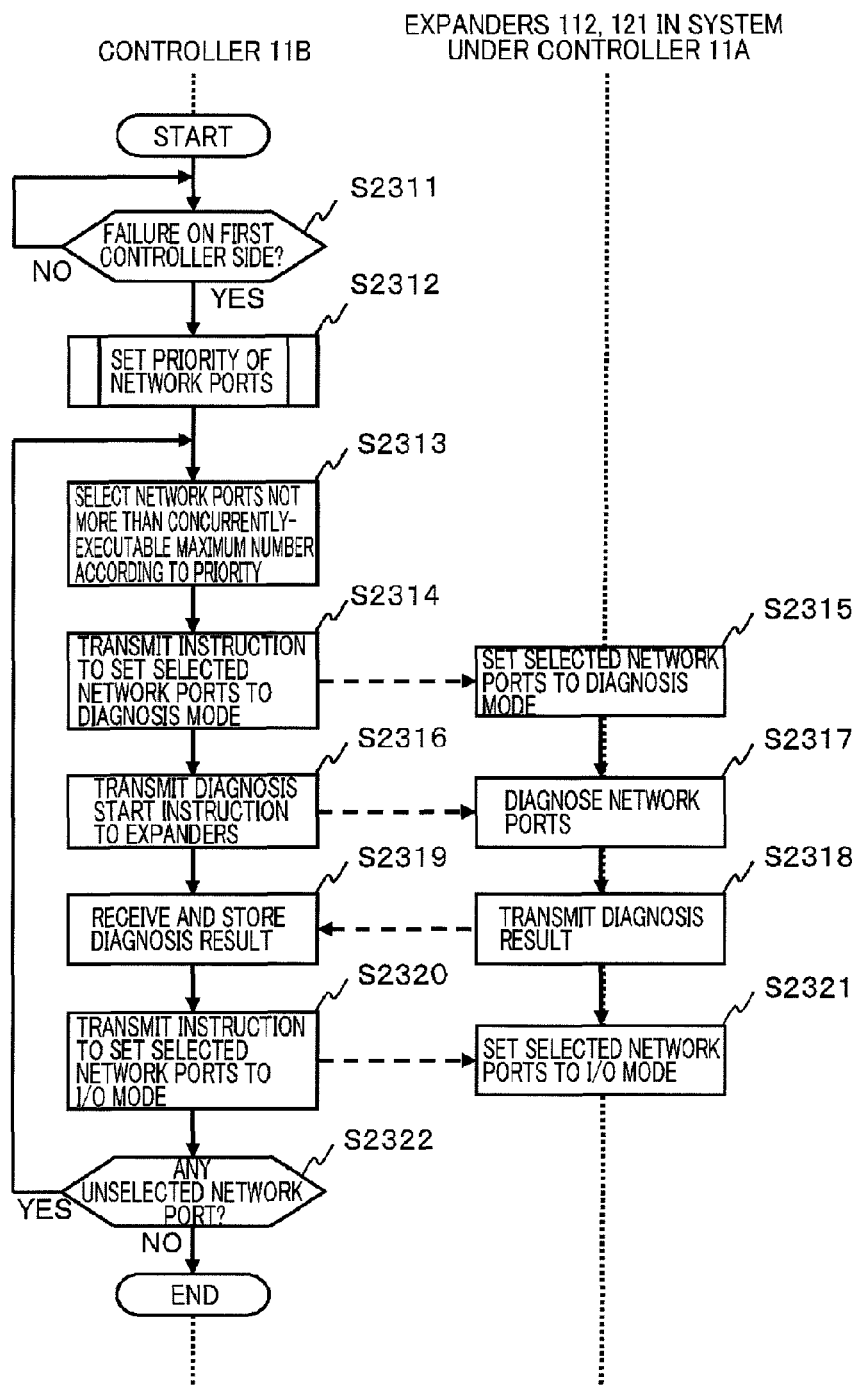
FIG. 23 is a flowchart for illustrating the other of the systems diagnosis process S2300.

FIG. 23 is an example of a process performed in the storage apparatus 10 in the case described above (hereafter referred to as other system diagnosis process S2300). In this process, the controller 11B acquires, from the first system through the communication path 15, information required to be acquired to perform other of the systems diagnosis process S2300.

As shown in FIG. 23, the controller 11B monitors in real time whether a failure has occurred in the first system (S2311). When detecting that a failure had occurred in the first system (S2311: YES), the controller 11B sets priorities to the communication ports 80 of the expanders 112A, 121A which belong to the first system (S2312). The controller 11B acquires information required for setting the priorities (such as an error counter value) from the controller 11A through the communication path 15.

Subsequently, the controller 11B sequentially selects the communication ports 80 with the highest priority within the concurrently-executable maximum number 65 among the communication ports 80 of the expanders 112A, 121A in the first system (S2313).

Then, the controller 11B transmits through the communication path 15, an instruction to set the communication ports 80 selected at S2313 (hereinafter referred to as target communication ports 80) to the diagnosis mode to the expanders 112A, 121A in which the target communication ports 80 are present (hereinafter referred to as target expanders 112A, 121A) (S2314). When receiving the instruction, the target expanders 112, 121 set the target communication ports 80 to the diagnosis mode (S2315), and set "Diagnosis mode" as the operation mode of the target communication ports 80 in the port management table 75 thereof.

Subsequently, the controller 11B transmits through the communication path 15, an instruction to start diagnosing the target communication ports 80 to the target expanders 112A, 121A (S2316). Upon receiving the instruction, the target expanders 112A, 121A start diagnosing the communication ports 80 (S2317).

When the diagnosis on the target communication ports 80 is completed, the target expanders 112A, 121A transmit through the communication path 15 the diagnosis result to the controller 11B (S2318). Upon receiving the diagnosis result, the controller 11B registers the result in the port management table 64 (S2319).

Thereafter, the controller 11B transmits through the communication path 15 an instruction to set the target communication ports 80 to the I/O mode to the target expanders 112A, 121A (S2320). Upon receiving the instruction, the target expanders 112A, 121A set the target communication ports 80 to the I/O mode (S2321) and sets "I/O mode" as the operation mode of the target communication modes 80 in the port management table 75.

After that, the controller 11B determines whether or not an unselected communication port 80 is present at S2313 (S2322). When it is present (S2322: YES), the step returns to S2313, while when it is not present (S2322: NO), the process is terminated.

As described above, when a failure occurs in the first system, the controller 11B in the second system mainly functions to cause the expanders 112A, 121A in the first system to diagnose the communication ports 80. Here, when the controller 11B in the second system controls the expanders 112, 121 in the first system to perform the diagnosis described in the first embodiment (the processing from S1012 to S1022 in FIG. 10), the performance of the storage apparatus 10 can be prevented from declining and the effects on the host computer 2 can be more efficiently suppressed. In addition, there is no need to suppress the reception of the data I/O request on the first system side during the diagnosis.

Although embodiments have been described above, the embodiments are to facilitate the understanding of the present invention and are not intended to limit the interpretation of the present invention. The present invention can be modified and improved without departing from the scope thereof and includes its equivalents.

The invention claimed is:

1. A storage apparatus comprising:
a first controller having a processor, a memory, and a network I/F that receives a data input/output request from an external apparatus;
a second controller having a processor, a memory, and a network I/F that receives a data input/output request from the external apparatus; a plurality of first expanders configuring a first system by being communicatively coupled to a storage drive, having a plurality of communication ports, and being in cascade connection with the first controller through the communication ports;
a plurality of second expanders configuring a second system by being communicatively coupled to another storage drive, having a plurality of communication ports, and being in cascade connection with the second controller through the communication ports, wherein
the first controller accesses the storage drive through at least one of the first expanders in response to the data input/output request,
the second controller accesses the other storage drive through at least one of the second expanders in response to the data input/output request,
the first controller transmits an instruction to execute a diagnosis on the communication ports to the first expanders,
the first expanders, upon receiving the instruction, diagnose the communication ports thereof, and
the first controller
stores a concurrently-executable maximum number being a maximum number of the communication ports concurrently diagnosable in the first system, and
causes the first expanders to execute the diagnosis on the communication ports in the first system by repeatedly performing a process of selecting a number of the communication ports not exceeding the concurrently-executable maximum number and a process of transmitting an instruction to perform the diagnosis on the selected communication ports to the first expanders.

2. The storage apparatus according to claim 1, wherein the first controller acquires a failure occurrence number of the communication ports of the first expanders, sets a priority to each of the communication ports based on the acquired failure occurrence number, and causes the first expanders to execute the diagnosis on the communication ports in the first system by repeatedly executing a process of selecting a number of the communication ports not exceeding the concurrently-executable maximum number in descending order of the priorities and a process of transmitting the instruction to execute the diagnosis on the selected communication ports to the first expanders.

3. The storage apparatus according to claim 1, wherein the first controller is communicatively coupled with an information apparatus having a user interface that receives the concurrently-executable maximum number, and the first controller receives and stores the concurrently-executable maximum number from the information apparatus.

4. The storage apparatus according to claim 1, wherein the first controller stores therein a coupling relationship between the communication ports, and based on the coupling relationship, the first controller selects the communication ports not exceeding the concurrently-executable maximum number so that at least one path to the storage drive communicatively coupled with the first expanders reachable from the first controller is secured during the diagnosis.

5. The storage apparatus according to claim 1, wherein the first expanders stop an I/O process using the communication ports being diagnosis targets when executing the diagnosis, and the first controller transmits to the first expanders, upon detection of a failure occurrence in the first system while the first expanders are executing the diagnosis on the communication ports, an instruction to stop the diagnosis on the communication ports concerned of the first expander and restart an I/O process using the communication ports concerned, and further transmits an instruction to diagnose other communication ports different from the communication ports concerned to the first expanders in the first system.

6. The storage apparatus according to claim 1, wherein the first controller transmits an instruction to diagnose the communication ports to the first expanders upon detecting a failure in the first system.

7. The storage apparatus according to claim 1, wherein the first expanders and the second expanders include a processor that executes the diagnosis, a memory that stores therein data and a program read and executed by the processor, and a switch circuit that controls data transfer between the communication ports.

8. The storage apparatus according to claim 1, wherein the first controller acquires a failure occurrence number of the communication ports of the first expanders, sets a priority to each of the communication ports based on the acquired failure occurrence numbers, and causes the first expanders to execute the diagnosis on the communication ports in the first system by repeatedly executing a process of selecting a number of the communication ports not exceeding the concurrently-executable maximum number in descending order of the priorities and a process of transmitting the instruction to execute the diagnosis on the selected communication ports to the first expanders, the first controller being communicatively coupled with an information apparatus having a user interface that receives the concurrently-executable maximum number, the first controller receives and stores the concurrently-executable maximum number from the information apparatus, the first controller has stored therein a coupling relationship between the communication ports, based on the coupling relationship, the first controller selects the communication ports not exceeding the concurrently-executable maximum number so that at least one path to the storage drive communicatively coupled with the first expanders is reachable from the first controller is secured during the diagnosis, the first expanders stops an I/O processing using the communication ports being diagnosis targets when executing the diagnosis, upon detection of a failure occurrence in the first system while the first expanders are executing the diagnosis on the communication ports, the first controller transmits, to the first expanders, an instruction to stop the diagnosis on the communication ports concerned of the first expander and to restart an I/O process using the communication ports concerned, and transmits an instruction to diagnose other communication ports different from the selected communication ports to the first expanders in the first system, the first controller transmits an instruction to diagnose the communication ports to the first expanders upon detecting a failure in the first system, and first expanders and the second expanders include a processor that executes the diagnosis, a memory that stores therein data and a program read and executed by the processor, and a switch circuit that controls data transfer between the communication ports.

9. A control method of a storage apparatus including a first controller having a processor, a memory, and a network I/F that receives a data input/output request from an external apparatus, a second controller having a processor, a memory, and a network I/F that receives a data input/output request from the external apparatus, a plurality of first expanders configuring a first system by being communicatively coupled to a storage drive, having a plurality of communication ports, and being in cascade connection with the first controller through the communication ports, a plurality of second expanders configuring a second system by being communicatively coupled to another storage drive, having a plurality of communication ports, and being in cascade connection with the second controller through the communication ports, wherein the first controller accesses the storage drive through at least one of the first expanders in response to the data input/output request;

the second controller accesses the other storage drive through at least one of the second expanders in response to the data input/output request; the first controller transmits an instruction to execute the diagnosis on the communication ports to the first expanders, the first expanders diagnose, upon receiving the instruction, the communication ports thereof;

the first controller, stores a concurrently-executable maximum number being a maximum number of the communication ports concurrently diagnosable in the first system; and causes the first expanders to execute the diagnosis on the communication ports in the first system by repeatedly performing a process of selecting a number of the communication ports not exceeding the concurrently-executable maximum number and a process of transmitting an instruction to perform the diagnosis on the selected communication ports to the first expanders.

10. The control method of a storage apparatus according to claim 9, wherein the first controller acquires a failure occurrence number of the communication ports of the first expanders, sets a priority of each of the communication ports based on the acquired failure occurrence number, and causes the first expanders to execute the diagnosis on the communication ports in the first system by repeatedly executing a process of selecting a number the communication ports not exceeding the concurrently-executable maximum number in descending order of the priorities and a process of transmitting the instruction to execute the diagnosis on the selected communication ports to the first expanders.

11. The control method of a storage apparatus according to claim 9, wherein the first controller is communicatively coupled with an information apparatus having a user interface that receives the concurrently-executable maximum number, and the first controller receives and stores the concurrently-executable maximum number from the information apparatus.

12. The control method of a storage apparatus according to claim 9, wherein the first controller stores a coupling relationship between the communication ports, and the first controller selects, based on the coupling relationship, the communication ports not exceeding the concurrently-executable maximum number so that at least one path to the storage drive communicatively coupled with the first expanders reachable from the first controller is secured during the diagnosis.

13. The control method of a storage apparatus according to claim 9, wherein the first expanders stop I/O processing using the communication ports being diagnosis targets when executing the diagnosis, and the first controller transmits to the first expanders, upon detection of a failure occurrence in the first system while the first expanders are executing the diagnosis on the communication ports, an instruction to stop the diagnosis on the communication ports concerned of the first expander and restart the I/O process using the communication ports concerned, and further transmits an instruction to diagnose other communication ports different from the communication ports concerned to the first expanders in the first system.

* * * * *